United States Patent
Allen et al.

(10) Patent No.: US 12,182,591 B2
(45) Date of Patent: *Dec. 31, 2024

(54) UPGRADE INFRASTUCTURE WITH INTEGRATION POINTS

(71) Applicant: Dell Products L.P., Hopkinton, MA (US)

(72) Inventors: Patricia Lee Allen, Hollis, NH (US); Charles C. Bailey, Cary, NC (US); Carole Ann Gelotti, Hudson, NH (US)

(73) Assignee: Dell Products L.P., Hopkinton, MA (US)

(*) Notice: Subject to any disclaimer, the term of this patent is extended or adjusted under 35 U.S.C. 154(b) by 570 days.

This patent is subject to a terminal disclaimer.

(21) Appl. No.: 17/506,196

(22) Filed: Oct. 20, 2021

(65) Prior Publication Data
US 2023/0120586 A1    Apr. 20, 2023

(51) Int. Cl.
*G06F 9/448*    (2018.01)
*G06F 8/65*    (2018.01)
*G06F 9/30*    (2018.01)

(52) U.S. Cl.
CPC ........... *G06F 9/4498* (2018.02); *G06F 8/65* (2013.01); *G06F 9/3005* (2013.01); *G06F 9/30098* (2013.01)

(58) Field of Classification Search
None
See application file for complete search history.

(56) References Cited

U.S. PATENT DOCUMENTS

| 9,342,291 | B1* | 5/2016 | Guo | G06F 8/65 |
| 2010/0293538 | A1* | 11/2010 | Wolf | G06F 8/65 |
| | | | | 717/170 |
| 2011/0113422 | A1* | 5/2011 | Ewington | G06F 8/658 |
| | | | | 717/176 |

(Continued)

OTHER PUBLICATIONS

Patricia Lee Allen, et al., "Upgrade Infrastucture With Integration Points," U.S. Appl. No. 17/502,094, filed Oct. 15, 2021.

(Continued)

*Primary Examiner* — Charles E Anya
(74) *Attorney, Agent, or Firm* — Muirhead and Saturnelli, LLC

(57) ABSTRACT

Techniques for performing an upgrade can include: defining integration points each associated with a workflow processing point included in an upgrade workflow; receiving command lists each include commands of an integration point; associating each command of a command list with a code entity; performing processing that performs an upgrade workflow to upgrade a system, wherein the processing includes: executing code corresponding to the upgrade workflow, wherein a workflow processing point of the workflow is associated with a first integration point; and in response to said executing reaching the workflow processing point corresponding to the first integration point, performing second processing including: executing commands of a command list associated with the first integration point; and for each command executed, invoking a corresponding code entity that performs customized processing in connection with upgrading a first feature, facility or service in the system.

19 Claims, 8 Drawing Sheets

(56) References Cited

U.S. PATENT DOCUMENTS

2019/0369980 A1* 12/2019 Mair .................. H04L 67/10
2024/0256268 A1* 8/2024 Wisse ................ G06F 8/656

OTHER PUBLICATIONS

Alex Kulakovsky, et al., "Meta Data Driven Upgrades," U.S. Appl. No. 17/364,927, filed Jul. 1, 2021.

U.S. Appl. No. 17/970,996, filed Oct. 21, 2022, entitled Upgrade Infrastructure With Integration Points Having Dynamically Determined Callbacks, Patricia Lee Allen.

* cited by examiner

```
public class CustomDataMigrationTasks {                                    ← 702 private CustomDataMigrationTasks() {
    }

/**
     * Returns the list of commands to run
     *
     * @return List
     */
    public static List<CycloneCommand> getList() {            ⎫
        List<CycloneCommand> list = new ArrayList<>();        ⎬ 704a // Upgrade internal host names
        list.add(new UpdateInternalHostNamesNduCommand());              ← 704b // Configure NVMe subsystem
        list.add(new ConfigureNvmeSubSystemCommand());                  ← 704c // Upgrade volumes
        list.add(new UpgradeVolumesToV2ClusterCommand());               ← 704d // Update host volume mapping is_internal flag
        list.add(new UpdateHostVolumeMappingIsInternalNduCommand());    ← 704e // Cleanup dummy storage network if configured
        list.add(new CleanupDummyStorageNetworkCommand());              ← 704f return list;      ← 704g
    }
}
```

UPGRADE INFRASTUCTURE WITH INTEGRATION POINTS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, which are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems typically do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system includes one or more processors, and a memory comprising code that, when executed, performs the method. The non-transitory computer readable medium includes code stored thereon that, when executed, performs the method. The method can include: defining a plurality of integration points, wherein each of the plurality of integration points is associated with one of a plurality of workflow processing points included in an upgrade workflow; receiving a plurality of command lists, wherein each of the plurality of command lists includes one or more commands and is associated with one of the plurality of integration points; associating each command included in one of the plurality of command lists with one of a plurality of code entities; and performing first processing that performs the upgrade workflow to upgrade a system, wherein the first processing further includes: executing first executable code corresponding to the plurality of workflow processing points, wherein a first workflow processing point of the plurality of workflow processing points is associated with a first integration point of the plurality of integration points; and in response to said executing reaching the first workflow processing point corresponding to the first integration point, performing second processing including: executing one or more commands of a first command list of the plurality of command lists, wherein the first command list is associated with the first integration point; and for each of the one or more commands of the first command list that is executed, invoking a corresponding one of the plurality of code entities associated with said each command of the first command list, wherein said corresponding one code entity performs first customized processing in connection with upgrading a first feature, facility or service in the system.

In at least one embodiment, each command included in one of the plurality of command lists can be associated with a corresponding one of the plurality of code entities that performs customized processing in connection with upgrading a feature, facility or service in the system. Each command included in one of the plurality of command lists can denote a single upgrade task in connection with upgrading one feature, facility or service in the system. Upgrading the first feature, facility or service can include performing a first plurality of upgrade tasks associated with the first integration point, and wherein the first command list can include commands denoting the first plurality of upgrade tasks.

In at least one embodiment, upgrading the first feature, facility or service can include performing a second plurality of upgrade tasks associated with a second integration point of the plurality of integration points, wherein the second integration point can be different than the first integration point, and wherein a second command list of the plurality of command lists can include commands denoting the second plurality of upgrade tasks. The plurality of workflow processing points can include a second workflow processing point. The method can include, in response to said executing reaching a second workflow processing point corresponding to the second integration point, performing third processing including: executing one or more commands of the second command list, wherein the second command list is associated with the second integration point; and for each of the one or more commands of the second command list that is executed, invoking one of the plurality of code entities that is associated with the said each command of the second command list, wherein said one code entity performs second customized processing in connection with upgrading the first feature, facility or service in the system. In response to determining that an upgrade failure occurs during a rollback window, first rollback processing can be performed that rolls back upgrade processing performed for a plurality of features, facilities or services including the first feature, facility or service. The upgrade failure can occur at the first integration point when executing a first command of the first command list. The upgrade failure can occur at the first integration point after executing a second command of the first command list, and wherein first rollback processing can include invoking one of a plurality of rollback code entities corresponding to the second command. The rollback window can be included in a cluster rollback window. Processing performed can include: persistently storing upgrade state information indicating that the upgrade failure occurred at the first integration point; and responsive to the upgrade failure occurring at the first integration point, restarting the upgrade workflow at the first integration point and executing each command of the first command list.

In at least one embodiment, in response to determining an upgrade failure occurs during a rollforward window, processing can be performed that includes first recovery processing for a plurality of features, facilities or services including the first feature, facility or service. The upgrade failure can occur at the first integration point when executing a first command of the first command list. The upgrade failure can occur at the first integration point after executing a second command of the first command list. The first recovery processing can include invoking one of a plurality of recovery code entities corresponding to the second command, wherein the one recovery code entity can perform recovery processing for the second command failing at the first integration point. Processing can include: persistently storing upgrade state information indicating that the upgrade failure occurred at the first integration point; and responsive to the upgrade failure occurring at the first integration point, restarting the upgrade workflow at the first integration point. Restarting can include executing each command of each of the plurality of command lists, including the first command list, associated with the first integration point.

In at least one embodiment, processing can include registering each command, that is included in one of the plurality of command lists, with a command engine. Registering can include identifying an associated one of a plurality of code entities to be invoked responsive to executing said each command. The first processing can be performed by an upgrade engine, and the command engine and the upgrade engine can be included in an upgrade infrastructure. The upgrade engine can include the first executable code that implements a state machine controlling the upgrade workflow to upgrade the system. The system can be a data storage system.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 6 is an example illustrating information that can be included in a file and used in connection with adding commands to a command list associated with an integration point in an embodiment in accordance with the techniques of the present disclosure.

DETAILED DESCRIPTION OF EMBODIMENT(S)

Figure 1:
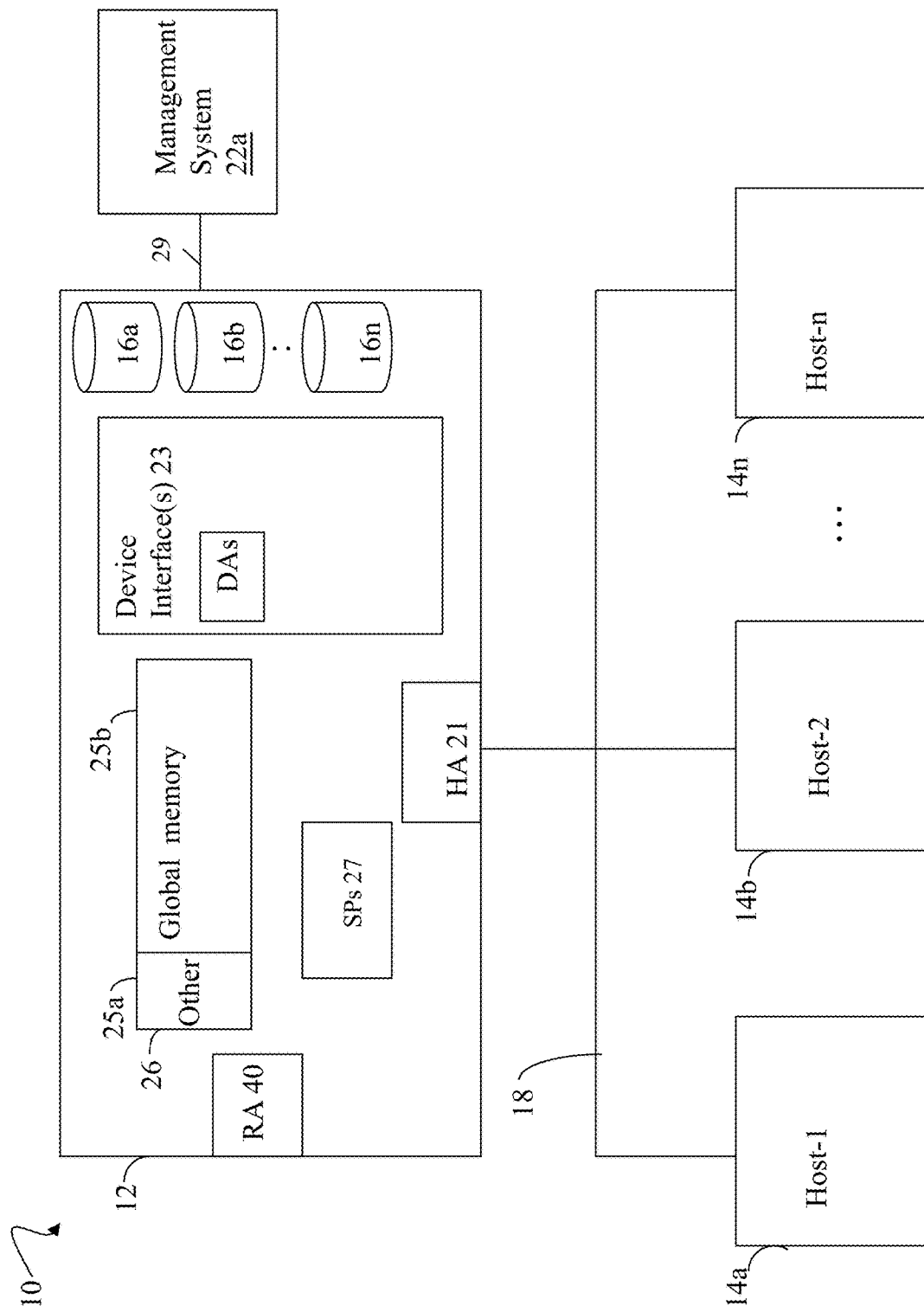
FIGS. 1 and 3 are examples of components included in a system in accordance with the techniques of the present disclosure.

In at least one existing data storage system, a non-disruptive upgrade (NDU) can be performed where a data storage client, such as a host, is provided with continuous uninterrupted service and access to data stored on the data storage system. At least one such data storage system can include one or more dual node appliances providing high availability. If the system includes multiple dual node appliances, the multiple appliances can form a cluster or federation of the dual node appliances.

The NDU can be performed across the one or more appliances of the data storage system, for example, to upgrade existing software on all appliances of the system. One existing NDU technique can be characterized as a rolling upgrade because each appliance is upgraded and restarted, one after another, until all appliances in the systems have been upgraded. With the NDU, the data storage system can continue to provide uninterrupted service and access to the data while the software is being upgraded to the next version across all appliances of the system.

To provide uninterrupted service during the upgrade, complex coordination and orchestration of the upgrade processing is typically needed. For example, in at least one existing data storage system with a cluster of multiple dual node appliances, orchestration is needed to coordinate performing the upgrade across the multiple appliances. When upgrading each node of the appliance, the remaining peer node can handle the full workload (e.g., all I/Os, requests, and the like) of both nodes. Thus, different components are upgraded at different times throughout the complex upgrade procedure to ensure uninterrupted service providing data access and to maintain cluster high availability. However, providing the NDU also introduces complex dependencies between the different versions of software and data that can exist and run during the cluster upgrade. Upgrades can be complicated because, in addition to orchestrating the complex dependencies of a mixed version cluster, there can be many upgrade preconditions and postconditions to be satisfied in order to successfully complete the upgrade.

As a result, implementing an upgrade to a particular service, facility or feature, such as by a software developer, can be complex. The particular steps that a software developer needs to perform as well as when different types of upgrade work can be implemented during the upgrade workflow, process or cycle in a particular release often requires a deep understanding of the upgrade process, release content, and general system-wide architecture. Additionally, code performing an upgrade can also be required to be resilient, for example, to deal with failures, rollbacks, the ability to continue running in a failed or mixed version cluster upgrade, recovery and restarts of the upgrade. If upgrade work or processing is done incorrectly or misplaced in the upgrade workflow, the cluster upgrade can fail or become unstable which can cause downtime and data-loss. Such instability and data loss within a data storage system are generally undesirable and unacceptable due to the adverse impacts such as, for example, regarding a customer's ability to use the data storage system. Thus generally the amount of knowledge typically needed to properly implement a software upgrade can be beyond that of most developers. Additionally, the failure to properly perform upgrade processing work within the upgrade workflow can result in adverse, undesirable and unacceptable behavior.

Typically in existing systems, data storage system upgrades can be custom solutions designed to upgrade to a specific version of software. Feature upgrade work to a particular service or facility can be a best effort to add code for the upgrade without necessarily understanding the impact to other services or facilities, the overall upgrade process or to the system. Existing systems generally lack a specific infrastructure or framework for coordinating the different components of the system through the NDU process to prevent runtime errors, upgrade collisions among services and/or data, and coordination between dependencies. Existing upgrade procedures used by software development teams can rely on experience and working knowledge of the developers to implement an upgrade for a particular service or facility. Thus existing upgrade processes and procedures can be error prone and can result in leaving an existing system being upgraded in an undesirable and/or unpredictable state.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where appliances of the system, and nodes of the appliances, can be upgraded in sequence. In at least one embodiment, the techniques of the present disclosure can use defined upgrade integration points which provide a defined structure to guide upgrades to data as well as upgrades to features, services or facilities through the complicated upgrade process.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the "n" hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
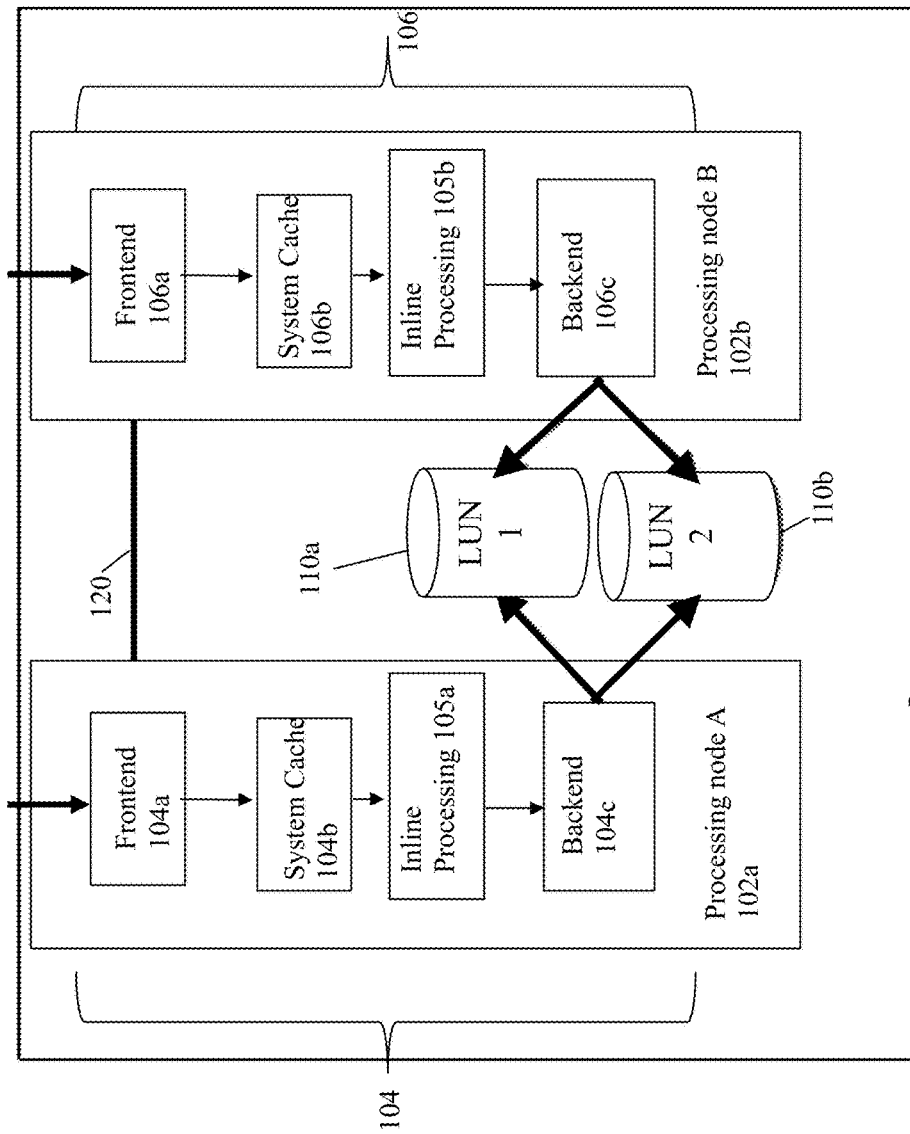
FIG. 2 is an example illustrating the I/O path or data path in connection with processing data in an embodiment in accordance with the techniques of the present disclosure.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105a, 105b as noted above, data is loaded from the main memory and/or other lower cache levels into its CPU cache.

In at least one embodiment, the data storage system is configured to include one or more pairs of nodes, where each pair of nodes is generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102a is the peer node of the node B 102b, and the node B 102b is the peer node of the node A 102a.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

In at least one embodiment, a data storage system can include one or more storage appliances where each such appliance is a dual node appliance such as described in connection with FIG. 2. In such an embodiment, each appliance can be a dual node appliance including two processing nodes 102a-b which communicate with each other over an internal network connection or interconnect 120 between the nodes 102a, 102b.

In at least one embodiment, each of the nodes 102a-b can be configured with one or more internal disk drives used only by that particular node. The internal disk drives of the nodes can be, for example, non-volatile solid state drives. For example, the node 102a can be configured with one or more internal disk drives used only by the node 102a. An internal disk drive of each of the nodes 102a-b can be used as the main boot device for the node. For example, a first internal disk drive of the node 102a can be used as the main boot device of the node 102a, and a second internal disk drive of the node 102b can be used as the main boot device of the node 102b. Each of the two nodes 102a-b can boot up and operate independently of the other node. In this case, the dual node architecture provides high availability for the single appliance including the nodes 102a-b in that, for example, if one of the nodes 102a-b is offline, down or generally unable to service requests, such as I/O operations, the other one of the nodes 102a-b which remains healthy and operable can still service and handle requests, such as I/O requests for LUNs having storage configured on BE PDs accessible only to the single appliance. Thus, with a dual node appliance, the appliance provides high availability in that the appliance can continue to service requests and provide access to data stored on its BE PDs in the event of a single node failure.

As noted above, implementing an upgrade to a particular service, facility or feature of the data storage system, such as by a software developer, can be complex. The upgrade can also include adding a new feature, service or facility as well as upgrading an existing feature, service or facility. The particular steps that a software developer needs to perform as well as when such particular upgrade work can be implemented during the upgrade process or cycle in a particular release often require a deep understanding of upgrade process, release content, and general system-wide architecture. Thus generally the amount of knowledge typically needed to properly implement a software upgrade can be beyond that of most developers.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where the appliances, and nodes of the appliances, can be upgraded sequentially. In at least one embodiment, the techniques of the present disclosure use defined upgrade integration points which provide a defined structure to guide feature, service, facility and/or data upgrades through the complicated upgrade process.

In at least one embodiment of the techniques of the present disclosure, an upgrade infrastructure with defined integration points can be utilized. The upgrade infrastructure or framework (sometimes simply referred to as infrastructure or framework) guides components of the system through the complicated upgrade process to reduce NDU runtime failures and errors associated with data and feature or service dependencies. The integration points provide organization and structure to the upgrade process. The integration points correspond to defined points in the upgrade process where specific types of work or upgrade processing can be performed during the upgrade workflow process.

In at least one embodiment, main areas of concern during upgrade can relate to data and also the components in the system. One main area of concern can be how one or more data source or containers used by the system and its components are upgraded. Such data sources or containers can include, for example, the data storage system configuration information regarding physical and/or logical entities in a current configuration of the data storage system. A second main area of concern can relate to how a particular component, such as a feature, facility or service, or a node or an appliance of the cluster, behaves while the cluster is being upgraded. For example, in at least one embodiment during the upgrade process as described in the following paragraphs, mixed versions of software can exist across appliances of the cluster. The techniques of the present disclosure can be used to coordinate and orchestrate transitioning appliances of the cluster from running a prior version of software of a particular feature, service or facility to an upgraded version of the software for the particular feature, service or facility.

In at least one embodiment, the integration points can each support either a data upgrade or a software (e.g., executable code) upgrade since these different types of upgrade operations are orchestrated at different phases in the upgrade to manage the complex dependencies between different versions of data and software. In at least one embodiment, a software upgrade can also include installing a new feature, service or facility (e.g., performing an initial installation of the new feature since this is an initial version of the new feature). In at least one embodiment, a data schema upgrade, cluster compatibility, feature enablement and pre-upgrade health checks are examples of directed upgrade work which can be supported through used of the defined integration points.

In at least one embodiment, each integration point defined in connection with an upgrade process or workflow can support a particular type of upgrade work. Such defined integration points makes it clear to a developer implementing an upgrade to a particular service or facility what options are available at a particular phase in the upgrade workflow, and where in the upgrade workflow a particular type of upgrade processing work is supported. In at least one embodiment, the integration points identify where particular types of upgrade work or processing are performed in the upgrade workflow to avoid, for example, runtime failures and to promote, for example, successful integration among multiple services and facilities as well as any upgrade dependencies.

To further illustrate in at least one embodiment, updates to the cluster wide management database can be supported at one or more integration points such as, for example, integration points 3B, 5B and 6 discussed below. However, in at least one embodiment, upgrading a local database that is locally used only by one appliance can only be done in connection with integration point 3A discussed below.

As another example in at least one embodiment, modifying or upgrading the schema or structure of the cluster wide management database can be performed, for example, in connection with integration points 3B and 5B. Data transformation or migration of existing content of the cluster wide management database can be performed, for example, in connection with the integration point 6, which can occur after the schema upgrade of the management database in connection with integration points 3B and 5B. The foregoing can be done to ensure, for example, that any data migration or transformation of the management database associated with integration point 6 takes place after the database schema upgrade to the management database has been completed in prior integration points 3B and 5B, and to ensure that data transformation at integration point 6 is complete before any new or upgraded feature behavior is enabled at a following subsequent integration point such as, for example, integration point 9 discussed below.

In at least one embodiment using the defined integration points of the cluster upgrade workflow, customized upgrade work or processing can be integrated into the workflow in a consistent manner across multiple different features, services or facilities in a single upgrade, and also across multiple different upgrades. In at least one embodiment, the upgrade work or processing can include upgrading an existing feature, facility or service where a developer or user can provide additional code that performs the customized upgrade work at one or more corresponding integration points. In at least one embodiment, the upgrade work or processing can include adding a new feature, facility or service which does not exist in a current version of software running on the one or more appliances of the data storage system.

In at least one embodiment, the upgrade infrastructure code coordinates processing performed for an upgrade workflow. The upgrade infrastructure code can exist independently of other code of features, facilities or services which are upgraded and also independently of other code that performs customized processing to upgrade a feature, facility or service. The upgrade infrastructure code can define particular integration points identifying where other developer-provided code (e.g., also sometimes referred to as user code, user-specified code or user-provided code where the feature or facility developer can be the "user") can be invoked or triggered to perform any needed upgrade work or processing to upgrade a particular feature, facility or service. In this manner, the upgrade infrastructure code can be tested and maintained separately from other user-provided code which is invoked at a particular integration point, where the user-provided code performs customized upgrade work to implement an upgrade to a particular feature, service or facility. Thus, code which performs customized processing to upgrade a particular feature, service or facility can be written by the developer of such a feature or service. The developer, as a user of the upgrade infrastructure, does not need complete or intricate knowledge regarding the upgrade infrastructure code. Rather, the developer can have a more limited working knowledge regarding the particular defined integration points of the infrastructure. The developer of a particular feature, service or facility, as a user of the upgrade infrastructure, can specify what code routines or modules are invoked at the defined integration points, where the code routines or modules perform customized upgrade work or processing to upgrade the particular features, service or facility without modifying the code of the upgrade infrastructure. In at least one embodiment, the upgrade infrastructure code can perform some required general processing to upgrade a feature, service or facility such as, for example, install an updated software version of the feature, service or facility on all the nodes of the appliances and coordinate such installation across the nodes and appliances of the system. The integration points can be characterized as hooks or points which identify upgrade workflow processing points at which a user or developer can perform additional customized upgrade processing work for the particular feature, service or facility being upgraded. Thus in at least one embodiment, the work or processing needed to upgrade a service, facility or feature can be partitioned between the upgrade infrastructure code and other user or developer provided code invoked at the different integration points.

In at least one embodiment, the techniques of the present disclosure can be used to provide an NDU that is a rolling upgrade providing support for: appliance high availability where one node of an appliance can be upgraded at a time; cluster high availability as each appliance is upgraded one appliance at a time; cluster database upgrades (e.g., upgrades to the management database) and local appliance database upgrades; upgrading a client code module within the cluster where the client code module invokes or uses an upgraded version of a feature, facility or service being upgraded (e.g., where a first appliance or first node can include the client code module which performs a call or request to a second appliance or second node including the feature, facility or service being upgraded); an upgrade that can include installing a new feature, service or facility; data upgrades; container or VM placement whereby services can be moved between nodes; and cluster heath checks.

In at least one embodiment providing cluster high availability, all appliances in the system can execute with runtime behavior of the same version of software at any point in time with one or more appliances sometimes operating in a runtime compatibility mode discussed in more detail below. The foregoing can provide for high availability within the cluster so that appliances can communicate with one another whereby one appliance can perform processing, as may be needed, on behalf of another degraded or unavailable appliance. In at least one embodiment, an upgraded feature may not be enabled on any appliance until integration point 9, as discussed below, where processing can be performed to enable the upgraded features across all appliances so that all appliances are enabled atomically. The foregoing provides for consistent inter-appliance communication as well as consistent communication with external data storage system clients, such as a host, in that any internal or external client of the data storage system can communicate with any node or any appliance of the system using the same software version. Thus, in at least one embodiment although an upgraded version of a feature, service or facility can be installed on less than all nodes or less than all appliances of the system, the upgraded version is not yet enabled for use on such nodes or appliances. Rather, in at least one embodiment of the techniques of the present disclosure, the upgraded version can be enabled for use once the upgraded version (e.g., upgraded software or code, as well as upgraded database schema and database content upgrades) has been committed and is successfully installed and ready for use on all nodes and all appliances of the system.

In at least one embodiment, the integration points of the upgrade infrastructure or framework can be characterized as specifying rules of an upgrade policy. The integration points can, for example, embody the policy rules and the scope and types of work or processing that can be performed at different upgrade workflow points associated with the integration points. Put another way, the integration points correspond to upgrade workflow processing points which are supported by the upgrade infrastructure for performing different types of allowable processing or work when implementing an upgrade for a feature, service or facility. For example as discussed below, data transformation or migration can be performed at integration point 6 after all appliances have been upgraded. However, the infrastructure does not support performing data transformation or migration, for example, at prior integration point 4A or 4B, since all appliances have not been upgraded at such prior integration points 4A and 4B.

In at least one embodiment, defined integration points can be used to specify and identify upgrade options and particular types of processing or upgrade work supported at different points in time in the upgrade workflow. The upgrade infrastructure can include code that drives and controls the upgrade workflow process and additionally performs calls to user or developer provided code associated with the different integration points at corresponding points in the upgrade workflow. The integration points can guide feature owners through the upgrade workflow by clearly identifying upgrade options that are supported at different corresponding upgrade workflow processing points. Thus the integration points provide structure for a user or feature developer that uses the upgrade infrastructure. For example, the integration points make it easy for the user or developer to understand what options are available for the types of upgrade work to be performed at different points in the upgrade workflow. A user or feature developer can, for example, provide user-specified code modules or routines that perform customized upgrade tasks. Each user-specified code module or routine can be associated with an integration point, where the integration point is further associated with a corresponding upgrade workflow processing point. The user specified code module which is associated with an integration point can be invoked by code of the upgrade infrastructure at an appropriate workflow processing point in the upgrade, where the workflow processing point is associated with the integration point. In at least one embodiment, the integration points can be further characterized as integration hooks for upgrading data and managing feature behavior during the upgrade. In at least one embodiment, the integration hooks represented by the integration points can denote specific points in the upgrade workflow where customized upgrade work or processing can be performed to implement an upgrade for a particular feature, service or facility. In at least one embodiment, the customized upgrade work or processing can be embodied in a user-provided or a developer-provided code module or routine which is invoked, by the infrastructure code, at an associated workflow processing point during the upgrade workflow process.

The runtime linkage between the user or developer provided code modules or routines and the infrastructure code can be defined and established using any suitable technique such that the user provided code modules or routines are invoked at different workflow processing points which are associated with different integration points. In at least one embodiment, the user or developer provided code module can be invoked at a corresponding upgrade workflow processing point using a callback mechanism which generally associates or links the user specified routine or code module with the corresponding integration point, where the integration point is further associated with a particular upgrade workflow processing point. For example, in at least one embodiment, a defined interface or API (application programming interface) of the infrastructure code can be used to specify the associated linkages between the integration points and corresponding user provided or developer provided code modules, routines or bodies of code which are invoked at particular workflow processing points corresponding to the associated integration points. For example in at least one embodiment, an API can be used to make a call into the infrastructure code where parameters of the API identify the association or runtime linkage between a particular user provided code module or routine and a corresponding integration point. The API call can be made from user or developer code to define and establish the necessary runtime linkages between the upgrade infrastructure code's integration points and other user provided code modules or routines associated with corresponding integration points. The particular syntax and semantics of the API can vary with implementation such as, for example, can vary with the particular coding or programming language used. For example, the API can specify to invoke a user provided code module or routine, "routine1", at integration point 1, where integration point 1 is further associated with workflow processing point 1 in the upgrade workflow controlled by the upgrade infrastructure. In this manner in at least one embodiment, the user provided code, "routine1", can be a callback routine or function where the name, a reference or a pointer to the user provided code, "routine1", can be passed as an argument in the defined API of the upgrade infrastructure, and where the callback routine or function "routine1" is subsequently invoked or called by the upgrade infrastructure code at an appropriate workflow point which is associated with integration point 1 in the upgrade workflow processing. In one embodiment in accordance with the techniques of the present disclosure, the foregoing API can be used to generally register the callback routine or function with a particular integration point of the upgrade infrastructure. More specifically, the foregoing API can be used to register, with the upgrade infrastructure, the association between the callback routine or function and a corresponding integration point at which the callback routine or function is later invoked by the upgrade infrastructure.

In at least one embodiment, each integration point can be associated with one or more callbacks or code entry points to the different user or developer provided code modules, routines or bodies of code. An integration point can be further associated with a corresponding upgrade workflow processing point. At runtime, the upgrade infrastructure code executes and can control or drive the upgrade workflow processing and can also invoke the user or developer provided code modules, routines or bodies of code at different upgrade workflow processing points. For example, a first user provided routine can be associated with a first integration point which is further associated with a first upgrade workflow processing point. The upgrade infrastructure code executes and, at the first upgrade workflow processing point, transfers control to the first user provided routine to execute code of the first user provided routine. Once the first user provided routine has completed execution, runtime control can transfer back to the upgrade infrastructure code to continue with the upgrade workflow processing and additionally invoke any user provided code modules or routines which are associated with corresponding subsequent upgrade workflow processing points.

The foregoing and other aspects of the techniques of the present disclosure are described in more detail in the following paragraphs.

Figure 3:
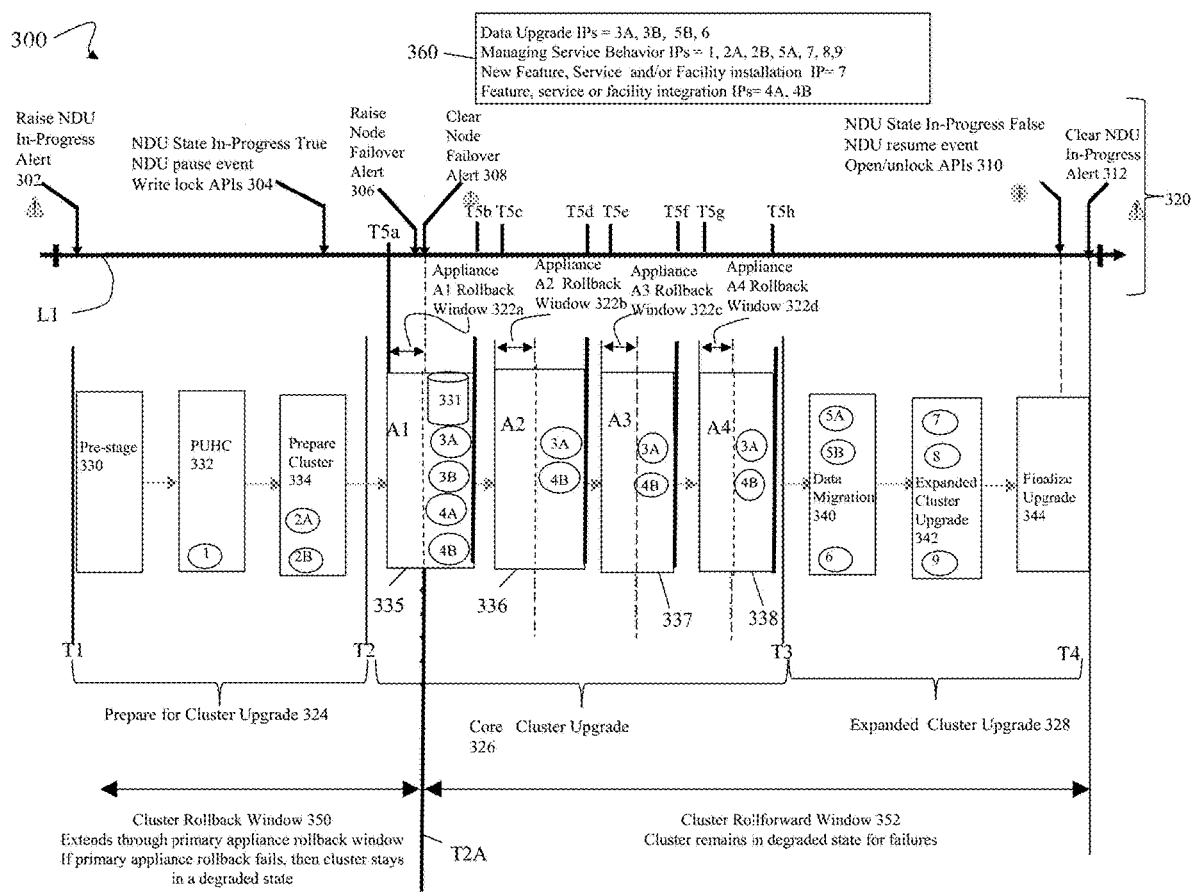

Referring to FIG. 3, shown is an example 300 illustrating components and integration points in at least one embodiment in accordance with the techniques of the present disclosure.

In the example 300, there are 4 dual node appliances A1 335, A2 336, A3 337 and A4 338 in the data storage system cluster or federation of appliances for illustrative purposes. More generally, the data storage system can include one or more appliances. In at least one embodiment illustrated in the example 300, integration points can be specified, where the integration points discussed below can include the following: 1, 2A, 2B, 3A, 3B, 4A, 4B, 5A, 5B, 6, 7, 8 and 9. Each of the foregoing integration points are denoted in the FIG. 3 illustrating where processing associated with such integration points can be performed in the upgrade processing workflow. In particular, the upgrade infrastructure or framework can include code which performs the illustrated upgrade processing workflow and additionally includes hooks or support at the different defined integration points where other developer or user provided code can be invoked to perform customized upgrade work or processing to implement an upgrade of a particular feature, service or facility.

In at least one embodiment, the upgrade infrastructure can include code that prepares for the cluster upgrade phase 324, performs processing for the core cluster upgrade phase 326, and performs processing of the expanded cluster upgrade phase 328. Code of the upgrade infrastructure can drive or control the upgrade workflow phases 324, 326 and 328 and additionally perform calls to user provided code at the various integration points to perform customized upgrade work or processing in connection with upgrading different features, facilities or services. As illustrated in FIG. 3 in at least one embodiment, the phases 324, 326 and 328 can be performed sequentially in order. In at least one embodiment, the phase 324 can include performing processing denoted by the elements 330, 332 and 334 sequentially. In the phase 324 in at least one embodiment, the processing associated with integration points 1, 2A and 2B can be performed in sequential order. In the phase 326 in at least one embodiment, each of the appliances 335-338 can be upgraded sequentially characterizing a rolling upgrade of the appliances 335-338. When the primary or first appliance 335 is upgraded, the processing associated with the integration points 3A, 3B 4A and 4B can be performed in sequential order. When each of the secondary appliances 336-338 is upgraded, the processing associated with the integration points 3A and 4B can be performed in sequential order. As illustrated in FIG. 3 in at least one embodiment, the phase 328 can include performing processing denoted by the elements 340, 342 and 344 sequentially in order. In the phase 328 in at least one embodiment, the processing associated with integration points 5A, 5B, 6, 7, 8 and 9 can be performed in sequential order.

In at least one embodiment as denoted by the element 360, the integration points 3A, 3B, 5B and 6 can be characterized as generally related to processing performed in connection with the management of data or upgrading the data in the system such as, for example, the cluster-wide management database and its contents, and the appliance-local databases and their contents.

In at least one embodiment as denoted by the element 360, the integration points 1, 2A, 2B, 7, 8 and 9 can be characterized as generally related to processing performed in connection with managing the behavior of features, services and/or facilities on the system.

In at least one embodiment as denoted by the element 360, the integration point 7 can be characterized as generally related to processing performed in connection with installing a new feature, service of facility on the system, where the system does not currently have any version of the new feature, service or facility prior to the installation at the integration point 7.

In at least one embodiment as denoted by the element 360, the integration points 4A and 4B can be characterized as generally related to processing performed in connection with integration of the upgraded features, services and/or facilities with other components.

The foregoing regarding the various integration points, phases and processing performed in connection with the upgrade workflow illustrated in FIG. 3 is described in more detail in the following paragraphs.

The upgrade processing workflow of FIG. 3, and thus code of the upgrade infrastructure, can be invoked in response to a trigger event such as, for example, a user requesting that an upgrade of one or more features, facilities or services be performed. The user, for example, can make the request using a GUI of a data storage management application. For example, the user can make a selection of a user interface element, such as a menu selection, selection of a button, and the like, from the GUI of the management application. In response to the selection, the upgrade processing workflow of FIG. 3 can commence. Thus in at least one embodiment in response to the user selection, the code of the upgrade infrastructure in accordance with the techniques of the present disclosure can be launched and executed to perform processing of the upgrade processing workflow of FIG. 3 which is described in more detail in the following paragraphs.

The element 320 illustrates different alerts and feedback that can be provided to a user in connection with current progress of the upgrade over time. The line L1 denotes the time progression of the upgrade process where the line L1 is annotated with different information or feedback as may be provided at different points in time on a display of a GUI to a user or customer, such as a data storage administrator, of the data storage system.

The time T1 or 302 can denote the point in time when upgrade processing starts and results in display of the alert 302 indicating that the NDU is now in-progress. The point in time denoted by the element 304 indicates the point in time when the NDU is in-progress and the upgrade infrastructure performs processing to write lock, pause, temporarily block or disable use of particular APIs or commands such as those which can be invoked by an external client (e.g., external to the data storage system) using control path or management path requests. For example, a data storage system management application or script executing on a host or other external system can be external to the data storage system and can issue management commands or requests using one or more APIs, such as REST (representational state transfer) APIs, which can modify the data storage system configuration information. The externally issued REST API call can be, for example, a request to provision or configure a new LUN, where servicing or implementing the API requires modifying the existing data storage system configuration information as may be stored in a cluster data base on the data storage system. In this case, the upgrade infrastructure can perform processing which temporarily blocks or disables any externally issued control path REST API, such as from an external client, which writes, updates or performs modifications to a cluster database, such as the management database which includes the data storage system configuration information, which can be affected by the upgrade (e.g., where the data can be modified by the upgrade processing, and/or where the schema or structure of the data can be modified by the upgrade processing). In at least one embodiment, although the write lock is placed on the externally issued APIs at the time 304 where such externally issued APIs can modify data affected by the upgrade, all APIs which only get or read such data can still be allowed and serviced. For example, an externally issued REST API (e.g., from a script or a data storage management application) which reads data storage system configuration information from the management database, such as regarding the currently provisioned LUNs in the system, can still be serviced while other externally issued REST APIs which can write or modify the current data storage system configuration information of the management database are disabled or paused at the time 304.

Additionally in at least one embodiment, the write lock, pause or disabling of particular APIs in the step 304 can also affect what processing can be performed by code which upgrades a particular feature, service or facility. For example, user or developer code which performs processing to upgrade a particular service can be restricted as to when a particular REST API can be invoked, where the particular REST API modifies data storage system configuration information. For example, a first REST API which modifies the data storage system configuration information can be disabled at the point in time 304 and then re-enabled at the point in time 310. In this case, the user or developer code using the first REST API can only execute calls to the first REST API either prior to the time 304, or after the point in time 310.

At the point in time 306, an alert can be raised indicating that a node failover occurred within the appliance A1 335. At the point in time 308, an alert can be raised indicating that the alert for the appliance A1 335 regarding the node failover is cleared. More generally, in each dual node appliance, similar alerts for 306 and 308 can be raised as each node of the appliance is upgraded, fails over to its peer, and then reverts back online whereby the alert for the node is cleared 308.

At the point in time 310, an alert can be raised indicating that the NDU has completed and that the APIs previously paused, disabled, blocked or write locked in the step 304 are now re-enabled.

At the point in time 312, the NDU in-progress alert, which was previously raised at the point 302, can be cleared.

The prepare for cluster upgrade phase 324 can include pre-stage processing 330, PUHC (pre upgrade health check) processing 332 and prepare cluster processing 334. Generally, the phase 324 can include performing processing needed to prepare the cluster for the upgrade for one or more features, services or facilities and ensure that the cluster is in a healthy state in order to successfully perform the cluster upgrade. The pre-stage processing 330 can include, for example, copying the upgrade image or package to the data storage system such as, for example, to a staging area on each of the appliances 335-338. Subsequently, the upgrade image or package can be unbundled or unpackaged and stored in specified locations in the file system on each node. In at least one embodiment, the upgrade image or package can have a predefined format including code and/or data as well as other items, such as one or more scripts, that can be used during the upgrade process. Thus, the element 330 can include, for example, unpacking the multiple pieces of the upgrade image or package and then storing the different unpacked pieces of code, data and other items in particular locations on each node. For example, the particular locations can include particular directories, particular files having particular filenames in specified directories, and the like.

The PUHC processing 332 can be executed before every upgrade to ensure the cluster is sufficiently healthy to support performing an upgrade. In at least one embodiment, integration point 1 can be referred to as the "PUHC integration point" included in the workflow of the PUHC processing 332. The PUHC processing 332 for health or status checks can be run against the current version V1 of different features, services or facilities running in the appliances and also generally with respect to the current state or conditions of the appliances. In at least one embodiment, the PUHC processing 332 can be performed with respect to each of the appliances 335-228 of the system. A user of the infrastructure can specify a user provided code module or routine associated the PUHC integration point 1, for example, to check for a specific condition that must be satisfied before upgrading of a particular feature, facility or service can be performed. In at least one embodiment, the user provided code module or routine associated with integration point 1 can be invoked and executed on each of the appliances. For example with reference to FIG. 3, the user provided code module or routine associated with integration point 1 can be invoked and executed on each of the 4 appliances 335-338. As a variation, the user provided code module or routine associated with integration point 1 can execute on one of the appliances which can communicate with the other appliances to perform the necessary checks and other processing pertaining to each of the appliances 335-338.

In at least one embodiment, the specific condition checked for by the user provided code module or routine associated with integration point 1 can include, for example, checking that each appliance has at least a minimum amount of disk space (e.g., such as on an internal disk of the appliance, and/or on BE PDs used by the appliance) needed to perform the upgrade of the particular feature, facility or service. The specific condition checked for by the user provided code module or routine associated with integration point 1 can include, for example, checking that each appliance has running thereon a second feature, service or facility which can be, for example, used during the upgrade process and/or used by the particular feature, facility or service being upgraded. The specific condition checked for by the user provided code module or routine associated with integration point 1 can include, for example, checking that each appliance has running thereon a particular version of a second different feature, service or facility which can be, for example, used during the upgrade process and/or used by the particular feature, facility or service being upgraded. The specific condition checked for by the user provided code module or routine associated with integration point 1 can include, for example, checking that each appliance has currently running thereon a particular version of the feature, service or facility being upgraded. The specific condition checked for by the user provided code module or routine associated with integration point 1 can include, for example, checking that each appliance has running thereon one or more particular versions of a second feature, service or facility which are compatible for use with the upgraded version V2 of the particular feature, service or facility being upgraded from a current existing version V1.

Generally in at least one embodiment, the user provided code module or routine, which is associated with integration point 1 for a particular feature, service or facility to be upgraded, can perform processing to check for any desired preconditions or dependencies which need to be met in order to proceed with upgrading the particular feature, service or facility. In at least one embodiment, the upgrade processing can fail if any single check of the PUHC fails on any single appliance. More generally in at least one embodiment, processing performed by any user provided code module or routine for any integration point can determine an appropriate execution status based on the particular results and the processing performed by the user provided code module or routine. For example, depending on the particular health check condition checked for in integration point 1, the user provided code module invoked at integration point 1 can determine whether meeting the particular condition should result in an error, a warning, or another execution status. In at least one embodiment, a status of error can result in termination of the upgrade processing whereby the upgrade processing does not proceed until the associated condition no longer results in the error status. As a variation, a status of warning can denote a less severe condition than an error status whereby upgrade processing can be allowed to proceed if a warning status results from execution of the user provided code module or routine.

The prepare cluster processing 334 can include performing any necessary preparatory processing prior to proceeding with an upgrade of a particular feature, service or facility in the system. In at least one embodiment, the integration point 2A can be associated with a workflow processing point of the upgrade workflow in prepare cluster processing 334.

The integration point 2A can also be referred to as the "prepare cluster for upgrade" integration point which is associated with an upgrade workflow processing point at which upgrade tasks can be performed to prepare a component, such as a node or appliance, before the core cluster upgrade phase 326 begins. The integration point 2A executes in the context of the current running version of software and/or data on the appliances (e.g., such as V1) prior to performing an upgrade to version (e.g., V2) of software and/or data for one or more features, services or facilities. In at least one embodiment, the user provided code module or routine associated with integration point 2A can be invoked by the infrastructure code and executed with respect to each of the appliances. For example with reference to FIG. 3, the user provided code module or routine associated with integration point 2A can be invoked by the infrastructure code and executed on each of the 4 appliances 335-338, or alternatively execute on one of the appliances which then communicates with the remaining appliances to implement the desired processing, In at least one embodiment, services, features or facilities currently running on the appliance in the phase 324 can optionally continue to run during the upgrade, or alternatively can be paused, disabled or otherwise not run during the upgrade. In at least one embodiment, non-critical features, service or facilities can be paused, disabled or stopped during the upgrade at integration point 2A whereby only those particular features, services or facilities deemed critical continue to run during the upgrade. In at least one embodiment, it can be generally recommended that a feature, facility or service does not run during the upgrade processing in phase 326 unless required or necessary since the upgrade process can be significantly simpler for features, services or facilities that are not running during the subsequent upgrade phase, such as 326. For example, if a service which is upgraded is not running in the phase 326, the service does not have to support complex mixed version dependencies and does not have to support running in a compatibility mode on an appliance as discussed elsewhere herein (e.g., when executing in compatibility mode such as in the core cluster upgrade phase 326, the service may have been upgraded on an appliance from V1 to V2 but continues to run in accordance with the V1 runtime behavior in the phase 326).

The integration point 2A noted above can be used to prepare a feature, service or facility to run during the upgrade, or to alternatively disable, pause or not run/stop the feature, service or facility during the upgrade, such as during the phase 326. Generally, any feature, service or facility that is stopped, disabled or paused at the integration point 2A can be subsequently resumed, restarted, or re-enabled at the integration point 9 (e.g., the Expanded Cluster Upgrade Resume Services integration point) of the phase 328 described below. For example, integration point 2A can be used to manage placement of a particular service on a particular node of an appliance and/or to pause a particular service or facility such as, for example, a particular data protection service or facility running on the appliances 335-338. Thus, a user provided code module or routine can be associated with the integration point 2A for a particular feature, service or facility being upgraded, where the code module or routine can pause, disable or not run the particular feature, service or facility during the upgrade in the phase 326. More generally, the user provided code module or routine associated with the integration point 2A can pause, disable, stop or not run any desired feature, service or facility during the upgrade in the phase 326. Subsequently the feature, service or facility paused or stopped at the integration point 2A can be later restarted or resumed, for example, at the integration point 9 of the phase 328 or at the integration point 4A as discussed below.

The elements 322*a-d* denote appliance rollback windows, respectively, for the appliances A1-A4 335-338 where the particular appliances can rollback to a current version V1, for example, if a failure or error occurs when upgrading from the current version V1 to the version V2 of a feature, facility or service. In at least one embodiment with dual node appliances 335-338, an upgrade of a feature from V1 to V2 on an appliance such as 335 can be rolled back to V1 if there is an error or other event in the rollback window 332*a* causing the upgrade on the appliance 335 to fail. In at least one embodiment as discussed above with a dual node appliance, a first node of the appliance can be upgraded and then the second node of the appliance can be upgraded in sequence. In such an embodiment, the appliance can rollback to the prior version V1 of the feature if the upgrade of the second node to V2 has not yet commenced. In such an embodiment, the appliance level rollback processing can include using content of the second node still running V1 to rollback the first node's V2 upgrade to V1 by restoring the first node to its V1 or pre-upgrade state. For example, the content of the internal disk of the second node can be used to restore content of the internal disk of the first node, as may be needed, from V2 to V1, where such internal disks of the nodes can include code and/or data of the feature whose upgrade failed.

Thus generally the rollback windows 332*a-d* denote a window of time during which processing is performed to upgrade, respectively, the appliances 335-338 such that if a failure occurs during a particular appliance's rollback window, the particular appliance's upgrade can be rolled back or restored to a pre-upgrade state.

The integration point 2B can also be referred to as "the prepare cluster rollback integration point" which is associated with an upgrade workflow processing point at which upgrade rollback tasks can be performed when the cluster upgrade is rolled back such as, for example, due to an upgrade failure during cluster rollback window 350. The integration point 2B is associated with an upgrade workflow processing point where any needed rollback work can be performed in the event the cluster upgrade is rolled back such as due to an upgrade error or failure within the initial or primary appliance rollback window 322*a*. For example, in at least one embodiment, a user provided code module can perform rollback work at the integration point 2B, where the user provided code module can be invoked by the infrastructure code in response to rolling back the cluster upgrade such as due to an error or upgrade failure occurring during the rollback window 322*a* of the appliance 335. The user provided code module associated with integration point 2B can, for example, undo any processing performed previously in connection with another user provided code module associated with integration point 2A. For example, the user provided code module associated with integration point 2B can, for example, restart or resume any feature, service or facility which was disabled, paused or stopped previously on the appliances 335-338 by the other user provided code module associated with integration point 2A. A first routine can be associated with a first service being upgraded where the first routine performs preparatory work for upgrading the first service and wherein the first routine is invoked at integration point 2A. A second routine can be associated with a first service being upgraded where the second routine performs prepare cluster rollback work for the first service and wherein the second routine is invoked at integration point 2B in response to an upgrade error or failure occurring during the primary appliance 335's rollback window 322*a*. Generally, the second routine can perform processing to restore the appliances 355-338 to their pre-upgrade state and can include undoing processing performed by the first routine.

In at least one embodiment, the user provided code module or routine associated with integration point 2B can be invoked by the upgrade infrastructure when a cluster level rollback occurs such as due to an upgrade failure within the primary appliance's upgrade rollback window 322*a*. As part of implementing the cluster level rollback, the infrastructure code can call the user provided code module or routine associated with integration point 2B which can include restoration work to restore the appliances 335-338 to their pre-upgrade states. For example, the user provided code module or routine associated with integration point 2B can undo or reverse processing previously performed in connection with integration point 2A such as, for example, restarting, enabling or resuming any feature, service or facility previously stopped, disabled or paused in connection with the integration point 2A. The user provided code module or routine associated with integration point 2B can, for example, move any VMs, containers or applications back to their original pre-upgrade node configuration where such VMs, containers or applications were previously reconfigured for placement on different nodes by another user provide code module or routine executed in connection with integration point 2A.

The element 350 denotes a cluster rollback window which extends through the primary appliance rollback window 322*a*. If an error or failure occurs in connection with the upgrade workflow processing within the time window 350, a cluster level rollback can be performed. The cluster level rollback can include the infrastructure code invoking the one or more user provided code modules of integration point 2B, where the user provided code modules of integration point 2B are associated with one or more features being upgraded. In at least one embodiment, if the primary appliance rollback fails (e.g., such as when a failure occurs during execution of a user provided code module of integration point 2B), the cluster can remain in a degraded state.

The element 352 denotes a cluster rollforward window. If any error or failure occurs during the upgrade workflow in the window 352, the cluster can remain in a degraded state.

In at least one embodiment, the core cluster upgrade phase 326 can generally include installing and running the upgraded versions of the software and/or data for features, services or facilities being upgraded on the appliances of the cluster.

With reference to the time line L1, the appliance A1 335 can be upgraded in the time window T5a-T5b. The appliance A2 336 can be upgraded in the time window T5c-T5d. The appliance A3 337 can be upgraded in the time window T5e-T5f. The appliance A4 338 can be upgraded in the time window T5g-T5h.

In at least one embodiment in the core cluster upgrade phase 326, the upgrade infrastructure code can perform processing to upgrade each of the appliances 335-338 individually and sequentially in the time order illustrated, and also invoke any user specified or user provided code for the integration points 3A, 3B, 4A and 4B. Within each dual node appliance that is upgraded, the upgrade infrastructure code can perform processing to upgrade each node individually and sequentially and also invoke any user specified or user provided code for the integration points 3A, 3B, 4A and 4B that is applicable to the particular appliance upgraded (e.g., some integration points such as 4A and 3B may only be applicable to the primary appliance 335 as discussed below).

The appliance A1 335 is also sometimes be referred to herein as the primary appliance in that it is the initial or first appliance of the cluster to be upgraded. In particular in the phase 326, a first node of the appliance A1 335 can be upgraded from a current version V1 to a version V2 of a feature, service or appliance. Subsequently, the first node of the appliance A1 335 can be rebooted or restarted with the version V2 running but where the first node performs processing in a compatibility mode to operate in accordance with the prior version V1 (e.g., thus any features or services running operate in accordance with the version V1 compatibility). While the first node of the appliance A1 335 is being upgraded and prior to restarting, the first node fails over to the second node where the second node can perform processing to service all requests of the appliance A1 335. Once the first node of the appliance A1 335 has been upgraded to V2 and restarted, the second node of the appliance A1 335 goes offline, fails over to the first node while the second node is being upgraded from V1 to V2, and then restarts in a manner similar to that as described for the first node of the appliance A1 335. Once the appliance A1 335 has completed upgrading and restarting both of its nodes, the appliance A2 336 can similarly perform a node by node upgrade in the phase 326 in a manner as described for the appliance A1 335. Once the appliance A2 336 has completed upgrading and restarting both of its nodes, the appliance A3 337 can similarly perform a node by node upgrade in the phase 326 in a manner as described for the appliance A1 335. Once the appliance A3 337 has completed upgrading and restarting both of its nodes, the appliance A4 338 can similarly perform a node by node upgrade in the phase 326 in a manner as described for the appliance A1 335. Thus, in at least one embodiment, the appliances 335-338, and nodes thereof, can be upgraded individually in a sequence in the phase 326 as denoted in FIG. 3.

In the time window from T2-T3, the software and data version upgrade from V1 to V2 can be performed in the core cluster upgrade phase 326 in a sequential manner across the appliances 335-338. Thus during the time window T2-T3, the cluster of 4 appliances 335-338 can be characterized as running mixed versions V1 and V2 of the software and data until the upgrade from V1 to V2 is completed for the last or 4th appliance A4 338. In at least one embodiment, even though the appliances of the system can be running mixed versions of the software and data such as in the time window T2-T3, all appliances are operating in accordance with the current or old version V1 so that all appliances operate in accordance with the current or old version V1 even though they may have been upgraded to run V2 software. Those appliances which have been upgraded and are running the V2 software and have a V2 version and schema of data in the time window T2-T3 operate in a compatibility mode to perform processing and use an appropriate version and schema of data compatible with V1. Put another way, although an appliance may have been upgraded to run and use version V2 of software and data, the appliance operates in a runtime or execution compatibility mode in accordance with the V1 software and V1 data. In at least one such embodiment when operating in compatibility mode, any changes to a feature, service or facility in V2 can be disabled in an appliance. Furthermore, when in operating in compatibility mode, although data can be modified in V2 and/or the existing V1 data schema modified in V2, the appliance can operate using the V1 compatible data and the V1 data schema. For example in at least one embodiment, the appliance can retain the V1 data and its schema even though the appliance may also have thereon a V2 data and associated schema so that, when operating in compatibility mode, the appliance can use the V1 data and schema. Subsequently, the upgraded V2 feature using the V2 software and data can be enabled, such as integration point 9 discussed below, once the cluster or complete system upgrade has completed and is committed.

In at least one embodiment in the phase 324, the appliances 335-338 only have existing V1 software and data installed thereon and thus perform processing and execute in accordance with the existing V1.

In at least one embodiment in the phase 326, the cluster can have mixed versions V1 and V2 installed and running on the appliances 335-338, depending on the current point in time of the upgrade. During the phase 326, appliances of the cluster all operate (e.g., perform runtime processing and execute) in accordance with the existing V1. If a node or appliance has V2 installed and running thereon, that node or appliance can operate in a V1 runtime compatibility mode (sometimes referred to simply as compatibility mode) as discussed elsewhere herein. Thus in the phase 326, the upgraded V2 features can be characterized as disabled. As discussed in the following paragraphs, such upgraded V2 features can be subsequently enabled at integration point 9 of the phase 328.

In at least one embodiment in the phase 328, the upgraded version V2 of the software is installed and running on all the nodes of all the appliances where any final modifications to the data (e.g., database schemas and data transformations) are made in the phase 328 at the integration points 5B and 6 prior to the integration point 9.

In at least one embodiment, the cluster appliance upgrade can be characterized as committed once the processing associated with the integration point 6 has completed whereby the upgraded V2 features can be enabled in the integration point 9. Thus, subsequent to integration point 9 of the phase 328, all appliances no longer perform processing in the V1 runtime compatibility mode. Rather, the V1 runtime compatibility mode can be disabled and the appliances now operate and perform processing based on the upgraded V2 code and data. In at least one embodiment as illustrated in FIG. 3 after completion of processing associated with integration point 6, the new V2 software has been installed on all the appliances 335-338 of the cluster and data associated upgrade V2 work has also been completed on all the appliances 335-338. In such an embodiment after integration point 6, additional cluster upgrade work can be completed by the upgrade infrastructure or framework and also by user code routines or modules associated with integration points 7, 8 and 9 before the cluster upgrade work can be characterized as committed. In such an embodiment, the entire cluster upgrade can be characterized as committed after completion of associated processing for integration point 9 when all the upgrade work for the entire cluster has been completed.

As can be seen in FIG. 3, the integration points 3A, 3B, 4A and 4B are included in the core cluster upgrade phase 326. In at least one embodiment, the integration points 3A, 3B, 4A and 4B can be associated with upgrade workflow processing for an appliance occurring after the appliance has been upgraded with the V2 software and data. In other words, the user provided code modules or routines associated with the integration points 3A, 3B, 4A and 3B are invoked and execute on an appliance after the appliance has been upgraded with the V2 code and data for the one or more features, services or facilities. In at least one embodiment, code modules or routines associated with the integration points 3A, 3B, 4A and 4B can be executed on the primary appliance 335, and code modules or routines associated with the integration points 3A and 4B can be executed on the secondary appliances 336-338 (e.g., integration points 3B and 4A may not be associated with processing performed on the secondary appliances 336-338).

In at least one embodiment, the data storage system including the 4 appliances 335-338 can have one or more cluster-wide databases which include information used by all appliances of the data storage system. In such an embodiment, the management database 331 can be a system-wide or cluster-wide database which includes the data storage system configuration information discussed elsewhere herein, where the data storage system configuration information describes the current configuration of the data storage system. For example, the management database 331 can include information regarding the physical and logical entities in the data storage system, and can include configuration information identifying the particular appliances in the cluster. In at least one embodiment, the element 331 can denote the primary copy of the management database 331 stored on the primary appliance 335. Each of the remaining appliances 336-338 can include a local copy (not illustrated) of the management database 331 used for processing by the particular appliance. An embodiment can use any suitable mechanism to synchronize the management database 331 and local copies thereof on the appliances 335-338. Generally the management database 331 can be characterized as system-wide or cluster-wide in that it includes information relevant to the entire system or cluster.

Each of the appliances 335-338 can also include appliance level local databases (sometimes referred to simply as local databases) which can include information generally only applicable to the particular local appliance. In at least one embodiment, each appliance 335-338 can persistently store information in an appliance level local database which includes, for example, performance and workload statistics for the different LUNs configured on the BE PDs local to the appliance, and appliance level state and configuration information. The appliance level state information can describe, for example, the current progress of the upgrade with respect to the particular appliance, where the appliance level state information can also be duplicated or shadowed in the management database so that the management database 331 can describe a cluster view of the upgrade state.

The integration point 3A can be referred to as the "local database schema upgrade" integration point. The integration point 3A can be used to perform work to update the schema or structure of a local database of an appliance. The schema or structure update to the local database can include, for example, adding or removing a table from the local database, adding or removing a column from an existing table in the local database, and the like. In at least one embodiment, a user provided code module can update or modify the local database schema of local databases of the appliances 335-558 at the integration point 3A, where the user provided code module of integration point 3A can be invoked by the infrastructure code as described in more detail elsewhere herein.

The integration point 3B can be referred to as the "management database schema upgrade" integration point. The integration point 3B can be used to perform work to update the schema or structure of the management database 331, or more generally the cluster-wide or system-wide database with its primary copy stored on the primary appliance 335.

Thus, in at least one embodiment, the integration point 3B can be applicable only to the primary appliance 335. In at least one embodiment, a user provided code module can update or modify the schema or structure of the management database 311 at the integration point 3B, where the user provided code module of integration point 3B can be invoked by the infrastructure code as described in more detail elsewhere herein.

With respect to the primary appliance 335, the integration points 3A and 3B can be associated with upgrade workflow processing points after the control path is restarted on the primary appliance using the upgraded version V2 of the upgraded software running on the primary appliance 335. In at least one embodiment, the control path can be used to perform the schema changes to the management database 331 (e.g., integration point 3B) and the primary appliance's local database (e.g., integration point 3A). Thus, a first user provided code module or routine associated with integration point 3A and second user provided code module or routine associated with integration point 3B can be invoked by the infrastructure code and executed on, or with respect to, the primary appliance 335 to perform schema or structure changes to the local database and the management database of the primary appliance 335.

With respect to each of the remaining secondary appliances 336-338, the integration point 3A can be associated with an upgrade workflow processing point after the control path is restarted on each secondary appliance using the upgraded version V2 of the upgraded software running on the secondary appliance. In at least one embodiment, the control path can be used to perform the schema changes needed each appliance's local database. Thus, a first user provided code module or routine associated with integration point 3A can be invoked by the infrastructure code and executed on, or with respect to, each of the secondary appliances 336-338 to perform schema or structure changes to the local database of each such appliance.

The integration point 4A can also be referred to as the "primary appliance upgrade resume services" integration point. The integration point 4A can be used if a particular feature, service or facility is required to run on the cluster during the upgrade. As noted above in at least one embodiment, it can be recommended that only critical features, services or facilities run during the upgrade. In the event a feature, service or facility does run during the upgrade workflow processing, then the feature, service or facility operates or executes in accordance with the compatibility mode for the mixed version cluster. In at least one embodiment, upgrade workflow processing performed at the integration point 4A can include, for example, restarting, resuming or enabling a service that runs on the primary appliance 335, where the service can be a cluster service controller or orchestrator software component that schedules work on all appliances 335-338 of the cluster. Thus in such an embodiment, starting a service in connection with integration point 4A starts the service for use with all the appliances 335-338, or more generally, the entire cluster. For example, a replication service can be restarted by a user code module or routine at integration point 4A on the primary appliance 335 where the replication service can also schedule other work or processing, as may be needed, that is performed on the remaining secondary appliances 336-338.

The integration point 4A can be associated with upgrade workflow processing performed on only the primary appliance 335 after the primary appliance 335 has been successfully upgraded with the V2 software and after the database schema of the management database 331 stored on the primary appliance 335 has been upgraded in connection with V2 database schema changes associated with integration point 3B. The integration point 4A can be associated with a user provided code module or routine, for example, that resumes or restarts an upgraded service on the primary appliance 335 after the service software on the appliance 335 has been successfully upgraded from V1 to V2 and after the database schema of the management database 331 has been upgraded from V1 to V2 schema changes associated with the integration point 3B. In at least one embodiment, any work or processing performed by the user provided routine associated with the integration point 4A can be local to the appliance 335 and cannot, for example, use any cluster-wide commands or operations since the cluster appliances can be running mixed versions V1 and V2 of code of features being upgraded. The infrastructure code can invoke the user provided routine associated with integration point 4A after the primary appliance has been successfully upgraded to use the V2 software and after the V2 database schema upgrade of the management database 331 associated with the integration point 3B has been completed. For example, assume a service has been upgraded from V1 to V2 and the service is required to run during the upgrade process. In this case, the user provided routine associated with integration point 4A can start or run the upgraded V2 service in the compatibility mode so that the upgraded service performs processing at runtime in accordance with the prior version V1 of the service (e.g., as prior to the upgrade) and also the prior version V1 of the database schema of the management database. In at least one embodiment, the user provided routine associated with integration point 4A can only be executed on the primary appliance 335.

The integration point 4B can be associated with upgrade workflow processing performed on each of the appliances 335-338 after the appliance has been successfully upgraded. Generally, the integration point 4B can be associated with customized upgrade work which integrates the upgraded feature, service or facility with other components on the appliance (e.g., after the feature, service or facility has been upgraded on the appliance). The integration point 4B can be associated with a user provided code module or routine, for example, that resumes or restarts an upgraded service on one of the appliances such as 336 after the service software on the appliance 336 has been successfully upgraded such as from a prior version V1 to version V2. Consistent with discussion elsewhere herein, in this case, the upgraded service can be restarted to operate and run in a compatibility mode in accordance with the prior version V1 (e.g., software and data). Any work or processing performed by the user provided routine associated with the integration point 4B can be local to the particular appliance upon which the routine is executed. For example, the work or processing performed by the user provided routine associated with the integration point 4B can include establishing communications between different containers or VMs within the same appliance so that such containers or VMs can communicate with one another. The work or processing performed by the user provided routine associated with the integration point 4B cannot, for example, use any cluster-wide commands or operations since the cluster appliances can be running mixed versions V1 and V2 of code of features being upgraded. For each of the appliances 335-338, the infrastructure code can invoke the user provided routine associated with integration point 4B and execute the routine on each such appliance after the appliance has been successfully upgraded.

The expanded cluster upgrade phase 328 can include data migration processing 340, expanded cluster upgrade processing 342 and finalize upgrade processing. Generally in at least one embodiment, the data migration processing 340 can include providing further schema database updates such as to the management database and/or appliance local databases, and can include performing processing to transform, migrate or convert existing content of the management database and/or appliance local databases to use upgraded schemas. In at least one embodiment, the data migration processing 340 can include integration points 5A, 5B and 6 described in more detail below.

In at least one embodiment, the expanded cluster upgrade processing 342 can include installing new components; reconfiguring placement of the control path on a particular node of each appliance; restarting, resuming or enabling features, services or facilities that were previously stopped, paused or disabled in connection with prior integration points; and enabling the upgraded V2 features and the newly installed components. In at least one embodiment, the expanded cluster upgrade processing 342 can include the integration points 7, 8, and 9 described in more detail below.

In at least one embodiment, the finalize upgrade processing 344 can generally include any additional processing needed to finalize the upgrade. The element 344 can include, for example, performing cleanup processing for the upgrade such as deleting temporary files, releasing allocated memory used for holding in-memory temporary structures or information used in performing the upgrade, and the like.

The integration point 5A can be associated with processing performed to pause services prior to further management database schema updates (e.g., performed in connection with integration point 5B discussed below) and prior to performing migration or transformation of the existing content of the management database to use the upgraded V2 management database schema (e.g., performed in connection with integration point 6 discussed below).

The processing associated with integration point 5A can stop or pause a first service, for example, which may otherwise access and modify the management database while the management database is being upgraded in connection with processing of subsequent integrations points 5B and 6. If, for example, the first service continues running rather than being stopped or paused at integration point 5A, problems or issues (e.g., deadlock, data corruption, data inconsistencies, extended timeouts while attempting to perform an operation or task) can arise as a result of the first service accessing and/or modifying the management database at the same time other processing of integration points 5B and 6 is also trying the access and/or modify the management database.

A service that is paused or stopped in connection with integration point 5A can be restarted or resumed at the subsequent integration point 8. At the integration point 8, the service can be restarted when the appliances are running the upgraded V2 software and after the subsequent schema changes and data migration or transformation associated, respectively, with the integration points 5B and 6 have been completed. In at least one embodiment, a user provided code module or routine associated with integration point 5A and be invoked by the infrastructure code to pause, stop or disable one or more features, services or facilities.

For example, in at least one embodiment an upgrade can be performed to upgrade supported protocols by adding support for a storage access and transport protocol, such as NVMe (Non-volatile Memory Express), for SSDs. In connection with this upgrade, the management database schema can be modified at integration point 5B to add NVMe support such as add one or more new LUN attributes used with NVMe, and existing content of the management database can be migrated or transformed at integration point 6 to adapt to the existing data of the management database to the updated management database schema. In this case, a data replication service can be paused or stopped in connection with integration point 5A when the upgrade includes adding NVMe support as just described to avoid potential undesirable adverse consequences such as deadlock, data corruption or inconsistencies, extended operation timeouts, and the like. Such adverse consequences can result, for example, if the data replication service attempts to access and/or modify the same database structures (e.g., tables such as a volume table) and content which are also modified in connection with IP5B and IP6 to add NVME support.

The integration point 5B can be associated with processing performed to further modify the management database schema. In one aspect, the integration point 5B can be characterized as associated with a second chance to upgrade the management database schema after all appliances have been upgraded in the phase 326 to run the version V2 of the upgrade software. The integration point 3B can be associated with processing of a prior first chance to upgrade the management database schema. The integration point 5B can be characterized as similar to the integration point 3B with the difference that the integration point 5B is done after all appliances have been upgraded to run the version V2 of the upgraded software. In at least one embodiment, there may be cases where upgrading the management database schema cannot be done at the integration point 3B, for example, due to the state of the upgrade processing at the integration point 3B. To further illustrate, for example, it may be that performing schema updates to the management database to add new LUN attributes for the NVMe support requires that all the appliances 335-338 run the upgraded V2 software which does not occur until the phase 328 (e.g., even though such V2 feature may not yet be enabled until the subsequent integration point 9). In this case, the necessary schema updates to the management database for the LUN attributes cannot be implemented in connection with the integration point 3B.

The integration point 6 can be referred to as the "data migration or data transformation" integration point. The integration point 6 can be associated with processing performed to migrate or transform the existing content of the management database to conform to the upgraded V2 management database schema. In at least one embodiment, the integration point 6 can be associated with processing performed to migrate or transform the existing content of the local databases of the appliances to conform to the upgraded V2 local database schema. The integration point 6 can be associated with a user provided code module or routine invoked by the infrastructure code, where the user provided code module or routines performed processing including, for example, transforming or converting existing data stored in the management database by reformatting such existing data in accordance with the upgraded V2 management database schema. For example, consider the case where the upgraded management database schema includes a new LUN attribute added to an existing LUN or volume table, where the volume table includes a record for each configured or provisioned LUN in the data storage system. The processing performed by the user provided module or routine associated with integration point 6 can include providing a default or new value for the new LUN attribute for all LUN records stored in the volume table. For example, consider adding the new LUN attribute in connection with NVMe support where the new LUN attribute is an identifier, such as an NGUID (Namespace Globally Unique Identifier), used in connection with the NVMe standard to identify each LUN. In this case, integration point 6 processing can include generating unique new NGUID values for all existing LUNs each having a corresponding record in the volume table of the management database.

In at least one embodiment, integration point 6 is associated with an upgrade workflow processing point where all the appliances are running the upgraded V2 software and after database schema upgrades for V2 are applied to the management database schema (e.g., reflecting schema updates associated with prior integration points 3B and 5B). It should be noted that although the appliances 335-338 are running the V2 software and the database schema upgrades for V2 are applied to the management database schema (e.g., reflecting schema updates associated with prior integration points 3B and 5B) at integration point 6, such appliances 335-338 are still operating in accordance with the V1 compatibility mode using the V1 runtime behavior and the V1 data compatibility (e.g., using the V1 database schema).

In at least one embodiment, the user provided code modules or routines associated with the integration point 5A can be executed on all the appliances, the user provided code modules or routines associated with the integration points 5B and 6 which modify the management database can be executed on the primary appliance 335; and the user provided code modules or routines associated with the integration points 5B and 6 which modify the local databases can be executed on each of the appliances 335-338.

The integration point 7 can be associated with processing performed to install a new component, such as a new feature, service or facility. It should be noted that the component installed at the integration point 7 can be characterized as new in that the new component did not exist in the prior version V1 on the system prior to the upgrade. Put another way, for the new component being installed, this is the initial installation of the new component on the system. Further installing the new component may not be considered a modification or an upgrade to an existing V1 component such as an existing V1 feature, service or facility.

In at least one embodiment, the new component may further require that all appliances of the system already have been upgraded to the V2 software and data where the upgraded V2 software and data have been enabled (e.g., perform runtime processing in accordance with V2 runtime behavior and data schema). As an example, a new component can be installed in connection with integration point 7 which performs data replication to the cloud, where data is replicated from the data storage system to external cloud-based storage or simply "the cloud". Cloud storage is a cloud computing model that stores data on the Internet through a cloud computing provider which manages and operates data storage as a service. Cloud-based data storage can be delivered on demand with just-in-time capacity and costs, and eliminates buying and managing your own data storage infrastructure. With cloud storage, data is stored in logical pools, said to be on "the cloud". The physical storage of the logical pools of cloud-based storage can span multiple data storage systems and multiple data centers typically owned and managed by a storage provider or hosting company.

In at least one embodiment, processing performed by a user provided code module or routine invoked at integration point 7 can, for example, perform customized processing to install the new component on the appliances of the cluster. As noted above in at least one embodiment, the initial or first time installation of the new feature, facility or service can have a requirement to be installed appliances currently running the upgraded version V2 software and data, where such V2 features are currently enabled on the appliances providing V2 runtime compatibility. In other words in at least one embodiment, the new service may have an installation requirement in that the new service can only be installed on a data storage system currently running the upgraded version V2 of software (e.g., even though such V2 features have not yet been enabled).

To further illustrate, consider the following example. In order to support replication to the cloud in at least one embodiment, the data storage system itself may have to first be upgraded to use V2 software. The V2 software can, for example, support a new set of internally used APIs which are not supported in the prior V1 version of software and data. The new internally used APIs can be enabled for use with the new replication to the cloud service within the V2 software while still operating in accordance with the V1 compatibility mode (e.g., where the system operates in accordance with the V1 runtime behavior and V1 data schema). The new feature or service of replication to the cloud may use the new set of APIs included in the upgraded V2 software and thus require that the V2 software be installed on the appliances 335-338 prior to installation of the new replication to the cloud service. Depending on the embodiment, the new internally used APIs (e.g., such as used internally within the data storage system or cluster) can be enabled for use at integration point 7 as opposed, for example, to other new V2 APIs that can be used or exposed externally for use outside of the cluster. In this case, the internally used APIs can be contrasted with the other new V2 APIs which can be characterized as external and may not be enabled at integration point 7.

In at least one embodiment, such new components are added at integration point 7 after completion of integration point 6 processing whereby all appliances have been upgraded to use the upgraded V2 software and V2 database schema. In this manner, the new components can be installed on a stable upgraded cluster running the V2 software and V2 database schema. (e.g., V2 upgrades applied in connection with integration points prior to integration point 7). In at least one embodiment, if a new component installed at integration point 7 requires utilization of a new V2 API, or more generally other V2 functionally, not yet enabled at integration point 7 but rather where the new V2 API (or other V2 functionality) is enabled at integration point 9, a first user provided routine or code module invoked at integration point 9 can invoke or call back to a second user provided routine or code module associated with integration point 7 to configure or enable the new component after the new V2 API (upon which the new component depends) is itself enabled.

In at least one embodiment, the new component (e.g., new feature, service or facility) can be installed at the integration point 7 across the nodes of the multiple appliances 335-338 of the system in rolling sequential manner as discussed above in connection with performing an upgrade to a feature, service or facility in the phase 326.

In at least one embodiment, the newly installed components in connection with integration point 7 may not yet be enabled until the subsequent integration point 9 discussed below.

In at least one embodiment, each appliance can run an instance of the control path on one of the nodes of the appliance. In such an embodiment, one of the control path instances running on the appliances can be designated as the primary control path instance which receives incoming control path or management requests and communicates with external management clients, for example, such as the data storage system management application. The primary control path instance can be a driver or main control path instance which distributes control path or management requests to other control path instances on other appliances. For example, the primary control path instance can run on the primary appliance 335 where the primary control path can communicate with 3 control path instances respectively on the appliances 336-338.

In at least one embodiment, there can be a default node upon which the control path instance executes on each appliance. For example, each appliance can include 2 nodes designated as node A and node B. A default or static assignment can be made so that the control path instance of each appliance 335-338 runs on node A of the appliance.

The integration point 8 can be referred to as the "post cluster upgrade control path node preference" integration point. The integration point 8 can be used to dynamically manage and configure placement of the control path instance on each of the individual appliances 335-338.

The work or processing performed by a user provided routine associated with the integration point 8 can place or locate the control path instance of each appliance on a particular node of the appliance. For example, the user provided routine associated with the integration point 8 can locate and run a control path instance on node A of each of the appliances 335 and 337, and locate and run a control path instance on node B or each of the appliances 336 and 338. For each of the appliances 335-338 in at least one embodiment, the infrastructure code can invoke the user provided routine associated with integration point 8 and execute the routine on each such appliance. As an alternative in at least one embodiment, the user provided routine associated with integration point 8 can execute the routine, for example, on one of the appliances and then communicate with the other appliances to control placement of the control path instances across appliances of the cluster.

The integration point 9 can be referred to as the "expanded cluster upgrade resume services and enable new features" integration point. The integration point 9 corresponds to an upgrade workflow processing point where a feature, service or facility can be restarted. For example, a first service may have been previously stopped, paused or disabled in connection with the prior integration point 2A or 5A. The first service can now be restarted or enabled at the integration point 9 by processing performed by a user provided routine associated with the integration point 9. Additionally, the integration point 9 corresponds to an upgrade workflow processing point where the new or upgraded features, services or facilities can be enabled. Consistent with other discussion herein, during the upgrade prior to the integration point 9 (e.g., such as in the phase 326), the cluster runs in a V1 compatibility mode where new or upgraded V2 features are not enabled. The new or upgraded V2 features, services or facilities can now be enabled at integration point 9 by processing performed by a user provided routine associated with the integration point 9. In at least one embodiment, the infrastructure code can invoke the user provided routine associated with integration point 9 and execute the routine on each of the appliances 335-338. As an alternative in at least one embodiment, the user provided routine associated with integration point 9 can execute the routine, for example, on one of the appliances and then communicate with the other appliances to enable the new or upgraded features, services or facilities across all appliances of the cluster.

In at least one embodiment, once a new or upgraded feature, service or facility is enabled in connection with integration point 9, the appliances no longer run in V1 compatibility mode and rather execute and perform processing in accordance with the upgraded V2 version runtime behavior. If the upgrade includes modifications to the database schema, the upgraded or modified version V2 of the database schema can be used. Additionally in at least one embodiment, the new components installed at integration point 7 can also be enabled at the integration point 9.

Figure 4:
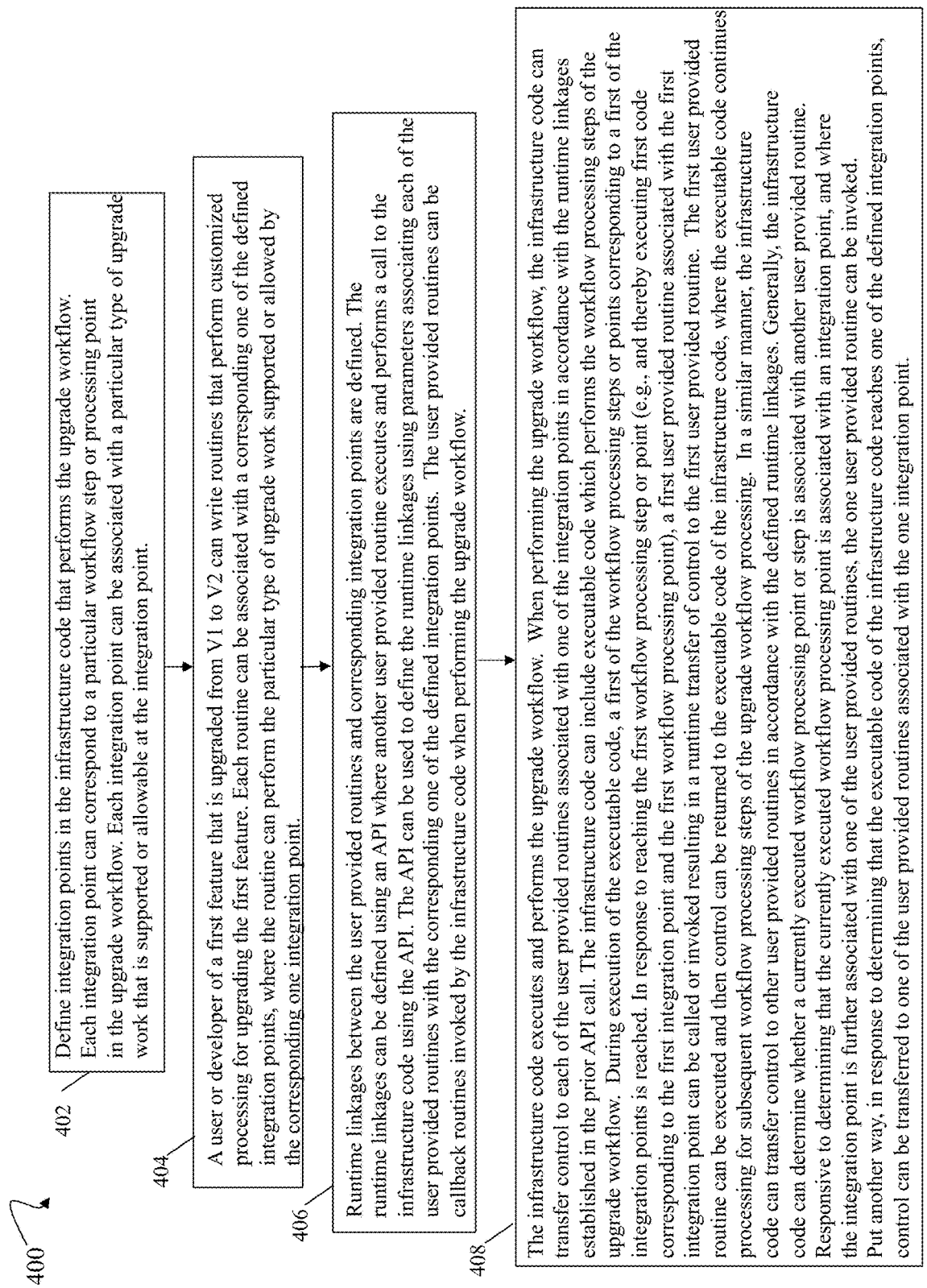
FIGS. 4 and 8 are flowcharts of processing steps that can be performed in an embodiment in accordance with the techniques of the present disclosure.

Referring to FIG. 4, shown is a flowchart 400 of processing steps that can be performed in an embodiment in accordance with the techniques of the present disclosure. The flowchart 400 summarized processing described above.

At the step 402, integration points can be defined in the infrastructure code that performs the upgrade workflow. Each integration point can correspond to a particular workflow step or point in the upgrade workflow. Each integration point can be associated with a particular type of upgrade work that is supported or allowable at the integration point. From the step 402, control proceeds to the step 404.

At the step 404, a user or developer of a first feature that is upgraded from V1 to V2 can write routines that perform customized processing for upgrading the first feature. Each routine can be associated with a corresponding one of the defined integration points, where the routine can perform the particular type of upgrade work supported or allowed by the corresponding one integration point. From the step 404, control proceeds to the step 406.

At the step 406, runtime linkages between the user provided routines and corresponding integration points are defined and established or instantiated. The runtime linkages can be defined using an API where another user provided routine executes and performs a call to the infrastructure code using the API to establish or instantiate the runtime linkages. The API can be used to define the runtime linkages using parameters associating each of the user provided routines with the corresponding one of the defined integration points. The user provided routines can be callback routines invoked by the infrastructure code when performing the upgrade workflow. From the step 406, control proceeds to the step 408.

At the step 408, the infrastructure code executes and performs the upgrade workflow. When performing the upgrade workflow, the infrastructure code can transfer control to each of the user provided routines associated with one of the integration points in accordance with the runtime linkages established in the prior API call. The infrastructure code can include executable code which performs the workflow processing steps of the upgrade workflow. During execution of the executable code, a first of the workflow processing points or steps corresponding to a first of the integration points is reached. In response to reaching the first workflow processing point or step (e.g., and thereby executing first code corresponding to the first integration point and the first workflow processing point), a first user provided routine associated with the first integration point can be called or invoked resulting in a runtime transfer of control to the first user provided routine. The first user provided routine can be executed and then control can be returned to the executable code of the infrastructure code, where the executable code continues processing for subsequent workflow processing steps of the upgrade workflow processing. In a similar manner, the infrastructure code can transfer control to other user provided routines in accordance with the defined runtime linkages. Generally, the infrastructure code can determine whether a currently executed workflow processing point is associated with another user provided routine. Responsive to determining that the currently executed workflow processing point is associated with an integration point, and where the integration point is further associated with one of the user provided routines, the one user provided routine can be invoked. Put another way, in response to determining that the executable code of the infrastructure code reaches one of the defined integration points, control can be transferred to one of the user provided routines associated with the one integration point.

Figure 5:
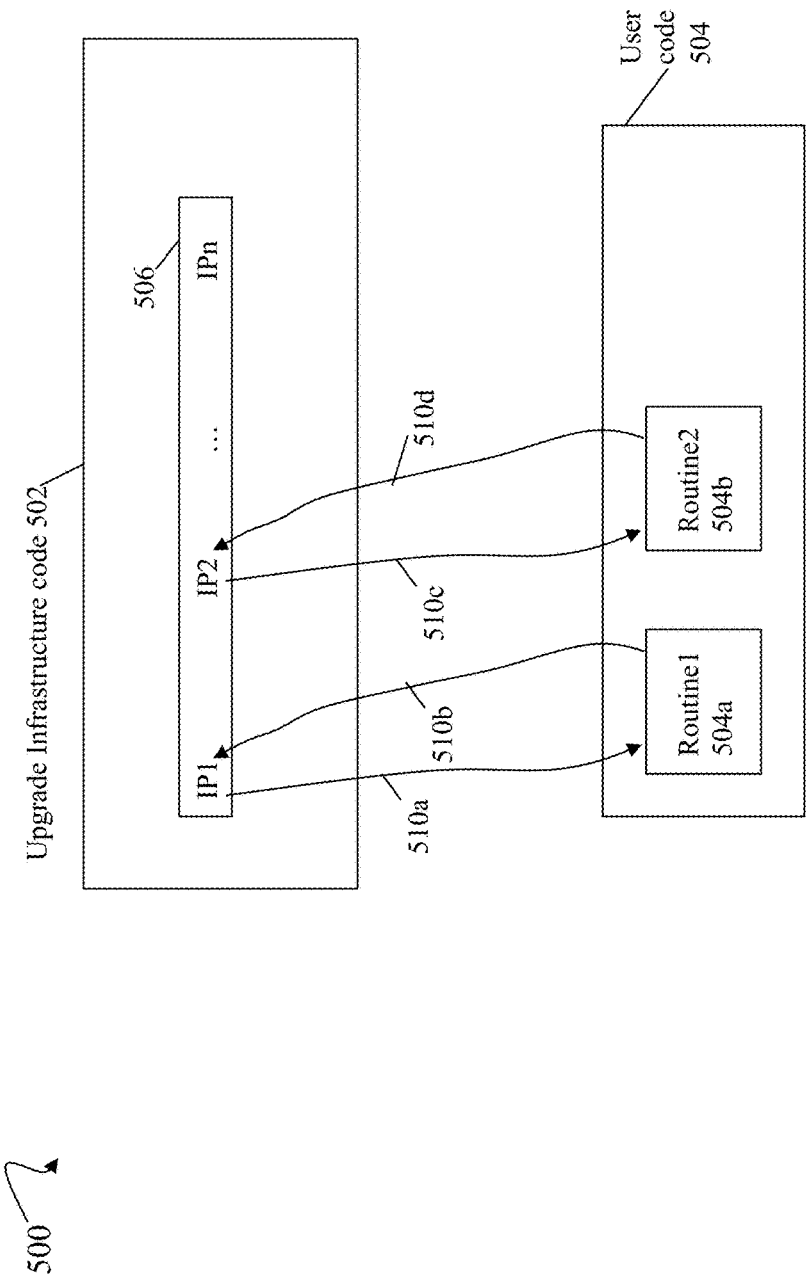
FIGS. 5 and 7 are examples illustrating use of callbacks from upgrade infrastructure code to user provided routines in an embodiment in accordance with the techniques of the present disclosure.

Referring to FIG. 5, shown is an example 500 illustrating use of callbacks to user provided routines in an embodiment in accordance with the techniques of the present disclosure.

The example 500 includes the upgrade infrastructure code 502, defined integration points (IPs) 506, and user code 504. The user code 504 includes routine 1 504a and routine 2 504b. An established runtime linkage can exist between integration point (IP)1 and the routine 1 504a. Another established runtime linkage can exist between IP2 and the routine 504b. The upgrade performance infrastructure code 502 can be executed to perform the workflow processing steps of the upgrade workflow such as described and illustrated in connection with FIG. 3. At runtime while executing the upgrade infrastructure code 502, a first workflow processing step or point of the upgrade workflow corresponding to the IP1 can be reached. In response to reaching the first workflow processing point or step corresponding to the IP1 during the executing of the code 502, runtime control can be transferred 510a from the IP1 to the routine 504a in accordance with the established runtime linkage between IP1 and 504a. Once the routine 504a has completed execution, control can be returned 510b to the code 502. The code 502 can continue execution with other workflow processing steps of the upgrade workflow. Subsequently, at runtime while executing the upgrade infrastructure code 502, a second workflow processing step or point of the upgrade workflow corresponding to the IP2 can be reached. In response to reaching the second workflow processing point or step corresponding to the IP2 during the executing of the code 502, runtime control can be transferred 510c from the IP2 to the routine 504b in accordance with the established runtime linkage between IP2 and 504b. Once the routine 504b has completed execution, control can be returned 510d to the code 502. The code 502 can continue execution with other workflow processing steps of the upgrade workflow.

What will now be described are additional aspects of the techniques of the present disclosure in connection with performing an upgrade or update to an existing feature, service or facility in a system. The following paragraphs can describe further aspects of the techniques of the present disclosure with reference to the NDU or upgrade process for a cluster-wide upgrade of a data storage system such as described above in connection with FIGS. 3, 4 and 5. The system can be a data storage system, or more generally, any suitable system. In at least one embodiment, the upgrade or update can be to an existing feature, service or facility in a cluster-wide data storage system upgrade such as described above.

In at least one embodiment using the upgrade infrastructure or framework such as described above, for example, in connection with FIGS. 3 and 4, a plugin-type of architecture can be used to add customized upgrade work which is integrated with the upgrade infrastructure or framework. In at least one embodiment, the plug-in architecture allows a user to specify upgrade work or processing in a user provided code entity which can be easily integrated with the upgrade infrastructure. The upgrade infrastructure can provide common core upgrade services and behaviors for the upgrade work or processing embodied in the user provided code entity. In one aspect in at least one embodiment, the architecture can be characterized as pluggable in that upgrade work embodied in one or more user provided code entities can be added and/or removed without modifying code of the upgrade infrastructure or framework. Additionally in such an embodiment, a first user provided code entity which performs processing to upgrade a first feature, service or facility can be added and used with the upgrade infrastructure or framework without modifying a second user provided code entity which performs processing to upgrade a second feature, service or facility which also uses the upgrade infrastructure or framework.

As noted above, integration points can be characterized as specific points in a defined upgrade workflow. In at least one embodiment, upgrade work or processing that performs a particular type of work can be added into an appropriate integration point by adding an upgrade command associated with the integration point. In at least one embodiment, an individual upgrade task can be encapsulated in a single command that can be plugged into the upgrade infrastructure or framework.

Consistent with the discussion above, upgrade processing to upgrade a particular feature, service or facility can be added to a new release by adding a callback command to an integration point. In at least one embodiment, each integration point can be associated with a workflow processing point where upgrade commands invoking associated user provided code entities can be added. Thus, in such an embodiment, each integration point can be implemented using a list of upgrade commands which are invoked by the upgrade infrastructure at the particular workflow processing point associated with the integration point. In at least one embodiment, there can be one list of upgrade commands for each integration point in the upgrade workflow. Each upgrade command can be standalone and independent of other upgrade commands. Users or developers implementing an upgrade for a particular feature, service or facility do not need to understand or modify the internals of the upgrade infrastructure. Testing effort can be significantly reduced because testing of new upgrade work added to upgrade a feature, service or facility can be generally limited to one or more new commands added to implement the upgrade of the particular feature, service or facility, where the new commands can be independent from other commands added to upgrade other features, service, or facilities.

In at least one embodiment, the typical lifespan of upgrade work performed to upgrade a particular feature for a particular release can be characterized in one aspect as temporary and can be applicable only for use with the particular feature and only when upgrading to the particular release. For example, when upgrading a feature F1 from version V1 to version V2, upgrade work can include adding a table to the management database at the integration point 3B and then populating the table at integration point 6. However, when upgrading F1 from version V2 to version V3, the foregoing processing performed when upgrading F1 from V1 to V2 can be omitted. In this case, the particular upgrade work performed for upgrading F1 from V2 to V3 can be completely different. In at least one embodiment, a pluggable architecture as described herein can be used in connection user code that performs the upgrade work and can be easily integrated with the upgrade infrastructure or framework. Subsequently, the user code can be easily decoupled from the upgrade infrastructure or framework after a particular upgrade of a particular feature is performed. Thus, clean up and removal of user code performing processing in connection with upgrading a particular feature in one release can be much simpler because upgrade work can be encapsulated into self-contained, single purpose, commands.

In at least one embodiment, the upgrade infrastructure can abstract away common upgrade responsibilities so feature owners, as users of the upgrade infrastructure, can focus on writing code associated with commands which only perform the upgrade work needed for their particular feature, service or facility. In at least one embodiment, a feature owner or user of the upgrade infrastructure can write code associated with an upgrade command, and then add the command to the appropriate integration point list. The upgrade orchestration can be handled by the upgrade infrastructure.

In at least one embodiment, a user of the upgrade infrastructure can perform the following. At a step S1, the defined integration points in the upgrade infrastructure such as described, for example, in connection with FIG. 3, can be examined. Following the step S1, a step S2 can be performed to map upgrade work to be performed for a particular feature, service or facility being upgraded to the appropriate one or more defined integration points. From the step S2, a step S3 can be performed to define or create an upgrade command for each upgrade task of the upgrade work to be performed. Each upgrade command can be associated with code, such as a module, routine or method, provided by the user. From the step S3, a step S4 can be performed where each upgrade command can be added to the appropriate integration point list in the upgrade infrastructure. Thus, the upgrade command can be associated with a list of one of the integration points based on the particular type of upgrade work performed by the code invoked in response to executing the upgrade command. The associated code can be invoked in response to the corresponding upgrade command being executed, run or called by the upgrade infrastructure at runtime.

As noted above in at least one embodiment, some upgrade processing can be performed and/or orchestrated by the upgrade infrastructure. For example in at least one embodiment, the upgrade infrastructure can perform processing including one or more of the following: instantiation or invocation of defined upgrade commands at the appropriate integrations points and associated workflow processing points in the upgrade; perform upgrade work in accordance with a specified order of execution of commands based on the defined ordering of workflow processing points; perform upgrade work at a single integration point in accordance with a defined ordering of commands at the single integration point; orchestrate processing for upgrade failures; orchestrate processing for upgrade rollbacks; perform upgrade progress monitoring and feedback; orchestrate processing for restarting an upgrade in response to a prior failure whereby the upgrade workflow can restart at the last point of failure; and handles persistently storing and restoring (e.g., on upgrade failure) upgrade state information as the upgrade workflow progresses.

In at least one embodiment, each integration point can have an associated command list identifying upgrade tasks and work performed at the particular integration point. The command list can be characterized as including commands corresponding to the customized upgrade tasks which users of the upgrade infrastructure can "plug" into the upgrade infrastructure to upgrade one or more features, services or facilities in a cluster-wide or system-wide upgrade.

What will now be described in the following paragraphs are further details regarding the upgrade infrastructure in at least one embodiment, and further details regarding the runtime linkage between the upgrade infrastructure and the user provided code entities, such as routines, modules or methods, which perform the upgrade tasks in connection with upgrading one or more features, facilities or services. The following description can make reference to implementing the upgrade infrastructure, the user code entities, and additional files defining the interfaces utilizing in the Java programming language. More generally, an embodiment in accordance with the techniques of the present disclosure can use any suitable programming language and techniques usable with such programming language. For example, in connection with the Java programming language used in at least one embodiment, pointers to functions or routines may not be supported as may be in other programming languages, such as the C or C++ programming language. In such other programming languages such as C or C++, pointers or references to the user provided code entities can be used in connection with an API as discussed elsewhere to associated particular user code entities with a particular integration point. However, in at least one embodiment using Java, a different technique can be used such as discussed in more detail below.

In at least one embodiment, a user can define and specify commands which the upgrade infrastructure calls, runs or executes at each particular integration point as described below in connection with FIG. 6.

Referring to FIG. 6, shown is an example 700 of an interface that can be used to identify the particular commands of a command list at a single integration point in at least one embodiment in accordance with the techniques of the present disclosure.

The example 700 illustrates an association between the single integration point 6 and the 5 commands of integration point 6. Integration point 6 is discussed above, for example, in connection with FIG. 3. The 5 commands of FIG. 6 can be executed at integration point 6 by the upgrade infrastructure during runtime when performing the system upgrade.

Consistent with other discussion herein in at least one embodiment, data transformation or migration of existing content of the cluster wide management database can be performed, for example, in connection with the integration point 6, which can occur after the schema upgrade of the management database (e.g., upgrading the management database schema from a V1 schema to a V2 schema) in connection with integration points 3B and 5B. The foregoing can be done to ensure, for example, that any data migration or transformation of the management database associated with integration point 6 takes place after the database schema upgrade to the management database has been completed in prior integration points 3B and 5B.

In at least one embodiment, the content of FIG. 6 can be included in a file or directory accessible to the upgrade infrastructure during runtime. In at least one embodiment, the file or directory can, for example, be included in a predetermined or default location denoting a common or public area, such as a directory, where the list of commands for each integration point can be specified.

The line 702 specifies a public class definition, where the class name can denote the particular integration point 6. For example, in at least one embodiment, each integration point can be a predefined name of a public class definition denoting the particular integration point. The class names corresponding to the integration points can be known and used by the upgrade infrastructure code. The particular class names denoting the integration points of the upgrade infrastructure can be exposed to, or known by, the upgrade infrastructure in any suitable manner. For example, the particular class names corresponding to the different integration points can be specified in another configuration file, hardcoded in code of the upgrade infrastructure, and the like.

The element 704 denotes statements or code that define the list of commands associated with integration point 6. The lines of 704*a* identify the particular method, getList, that the upgrade infrastructure code can invoke at runtime to return the list of commands (as an array) that are to be executed at integration point 6 by the upgrade infrastructure code. The lines 704*b-f* each identify a different command added to the command list of integration point 6. The line 704*g* is executed at runtime when the method getList is called to return the list of commands as an array. Thus, when a user wants to perform upgrade work of the type allowed in connection with integration point 6 in connection with upgrading a feature, facility or service, the user can add a different command for each upgrade task to be performed at integration point 6 in connection with upgrading the feature, facility or service. Consistent with other discussion herein, the type of upgrade work or processing performed by the commands of 704 can relate to migrating or modifying the current content of the management database to be in accordance with the newly defined V2 database schema. For example, as discussed above, in connection with upgrading the system in at least one embodiment, the management database schema can be modified at integration point 5B to add NVMe support such as add one or more new LUN attributes used with NVMe, and existing content of the management database can be migrated or transformed at integration point 6 to adapt to the existing data of the management database to the updated management database schema. For example, consider adding the new LUN attribute in connection with NVMe support where the new LUN attribute is an identifier, such as an NGUID (Namespace Globally Unique Identifier), used in connection with the NVMe standard to identify each LUN. In this case, integration point 6 processing can include generating unique new NGUID values for all existing LUNs each having a corresponding record in the volume table of the management database.

One or more of the commands 704*b-f* can includes performing processing in connection with transforming the content of the management database in connection with the added NVMe support. For example, the command 704*d* can include processing performed as noted above to update the contents of the management database in accordance with the V2 management database schema including adding values for one or more new LUN or volume attributes (e.g., new NGUID LUN attribute) to the V2 tables of the management database for currently defined LUNs or volumes.

Generally, the list of commands associated with a single integration point such as integration point 6 can include commands that, when executed at the associated integration point 6, perform upgrade tasks for one or more features, facilities or services. In a similar manner in at least one embodiment, a public class with a predetermined or specified name denoting each defined integration point can be used with a list of commands associated with the defined integration. A user can add commands to the particular command list associated with the particular integration point.

At runtime, code of the upgrade infrastructure can invoke each of the getlist routines or methods for the different public classes denoting the integration points, where the getlist routines or methods each returns a list of the user specified commands for one integration point. In user provided code, a user can define a Java class with the particular command added to the list by the user, where the Java class for the command can be later instantiated at runtime by the upgrade infrastructure code. For example with reference to FIG. 6, user provided code can include class definitions for the 5 commands 704*b-f*.

The foregoing as described in connection with FIG. 6 illustrates one way in which a user can add and associate commands with a particular integration point where such commands are executed, run or called by the upgrade infrastructure code at runtime at particular workflow processing points during the upgrade (e.g., during the upgrade workflow) such as described, for example, in connection with FIG. 3.

Generally, an embodiment can use any suitable technique to establish the runtime linkage or association between each command and the particular user provided code entity or command handler which is invoked in response to the upgrade infrastructure code executing the associated command. Described in the following paragraphs are additional details of how such runtime linkage can be established in at least one embodiment in accordance with the techniques of the present disclosure in a Java-based implementation.

As noted above, a user can specify a command and an associated routine or command handler where, in response to issuing the command at runtime, the associated routine or command handler is invoked to perform processing in connection with upgrading a feature, service or facility.

In at least one embodiment as described in connection with FIG. 6, commands can be added to a list of commands associated with a particular integration point. At runtime the upgrade infrastructure can invoke a routine, such as getlist, that returns the list of commands associated with the particular integration point. The upgrade infrastructure can then execute each command of the command list associated with the particular integration point to perform corresponding upgrade tasks or work at the particular integration point.

In at least one embodiment, each command can be defined as a Java class in user provided code. The class can have the same name as the command. At runtime, the class denoting the command name can be instantiated by the upgrade infrastructure code and marked with metadata (MD) denoting a property or attribute, such as using Java-based annotations, indicating that the class is a command. The user can also provide code that defines an application service class which includes a command handler (e.g., a method or routine) for the particular command. The application service class can be instantiated at runtime by the upgrade infrastructure code and similarly marked with MD denoting a property or attribute of service class, for example, using Java-based annotations. In at least one embodiment, the MD property of service class can indicate that the particular class is an application service class including handlers, such as command handlers, that can be invoked by other applications to perform a service. The application service class can include code of the command handler which is mapped to the particular command. The application service class can have a defined public interface for the command handler. In at least one embodiment using Java, the Java Reflections API can be used, for example, to scan the classes to determine the classes having a particular MD property or attribute as noted above; can be used, for example, to invoke a method at runtime, such as to invoke the command handler, and the like. The particular way in which the Java Reflections API can be used, if at all, can vary with embodiment.

In at least one embodiment the mapping or association between a command and its corresponding command handler can be based, at least in part, on a pattern match between at least a portion of the command and the corresponding handler. In such an embodiment, a naming convention can be established so that at runtime, the upgrade infrastructure can perform processing to search and discover the corresponding handler for a particular command. For example, in at least one embodiment, a user specified command in the list can be a variable with a variable name based on a predetermined pattern. For example, the variable name for the command can have a pattern of "XXXCommand" such as illustrated in FIG. 6, where "XXX" can generally denote a command name or identifier of a particular command and "Command" indicates that the variable name is a command. Generally, "XXX" as used in the variable naming can denote any suitable substring of any suitable length. For example, "XXX" can include any number of allowable characters meeting the particular requirements in the Java version and implementation utilized. For example with reference to the command added with the line 704*b*, "XXX" can be "UpdateInternalHostNamesNdu" which is concatenated with the substring "Command", where "Command" identifies "UpdateInternalHostNamesNdu" as a command.

The particular command handler associated with the command "XXX" can have a name based on a predetermined pattern such as, for example, "XXXCommandHandler". In this case, the variable name denoting the command and the name of its corresponding command handler can be automatically determined based on the matching substring pattern of "XXX" occurring in both the variable name of the command and the name of its associated command handler. The particular method which is the command handler can also have a portion of its name include a predetermined string, such as "CommandHandler" thereby indicating that the particular method is a command handler expected to match a name of a user specified command.

In at least one embodiment, the infrastructure code can perform processing to register the command and associated command handler, where the command handler is invoked in response to the infrastructure code executing the associated command at runtime. The infrastructure code can track the mapping between the command and its associated command handler. In at least one embodiment, the infrastructure code can use an event bus, such as the Vert.x™ event bus to invoke the command handler associated with the command at runtime. The Vert.x™ event bus is included in the Eclipse Vert.x™ toolkit by the Eclipse Foundation, where the foregoing toolkit can be used by applications running on the Java Virtual Machine (JVM). The Vert.x™ toolkit includes the event bus that is a light-weight distributed messaging system which allows different parts of an application, or different applications and services, to communicate with each other. The Vert.x™ event bus supports publish-subscribe messaging, point-to-point messaging and request-response messaging. In at least one embodiment, the infrastructure code can register command handlers associated with corresponding commands on the event bus. When the infrastructure code invokes or executes one of the commands, the infrastructure code can look up the defined mapping between the executed command and its associated command handler registered on the event bus, and then invoke the command handler using the event bus. In particular, an address of the command handler can be registered on the event bus and APIs of the event bus toolkit can be used to invoke the command handler so that runtime control is transferred to the address of the registered associated command handler.

In at least one embodiment, the infrastructure code can also include an upgrade engine that implements a state machine that drives and controls processing performed to implement the upgrade workflow. The upgrade engine can communicate with a command engine to run, execute or call a command. The command engine can map the command to its corresponding user provided code entity, where the code entity is invoked in response to executing the command. The command engine can facilitate transferring runtime control to the corresponding code entity when its associated command is invoked by the upgrade engine. The foregoing is illustrated in more detail in at least one embodiment in connection with FIG. 7 discussed below.

More generally, any suitable technique can be used to provide the runtime linkage and association between each command with its corresponding command handler, where, in response to executing the command, the command's corresponding command handler is invoked at runtime. As discussed above, one technique includes having a predetermined naming convention to identify commands (e.g., all command names include a predetermined substring such as "Command") and commands handlers (e.g., all command handler names include a predetermined substring such as "CommandHandler") as well as to identify a command and its associated command handler (e.g., common matching substring such as "XXX" in the names). As another example, the association between a command and its corresponding command handler can be explicitly specified in a configuration file such as by a user.

Figure 7:
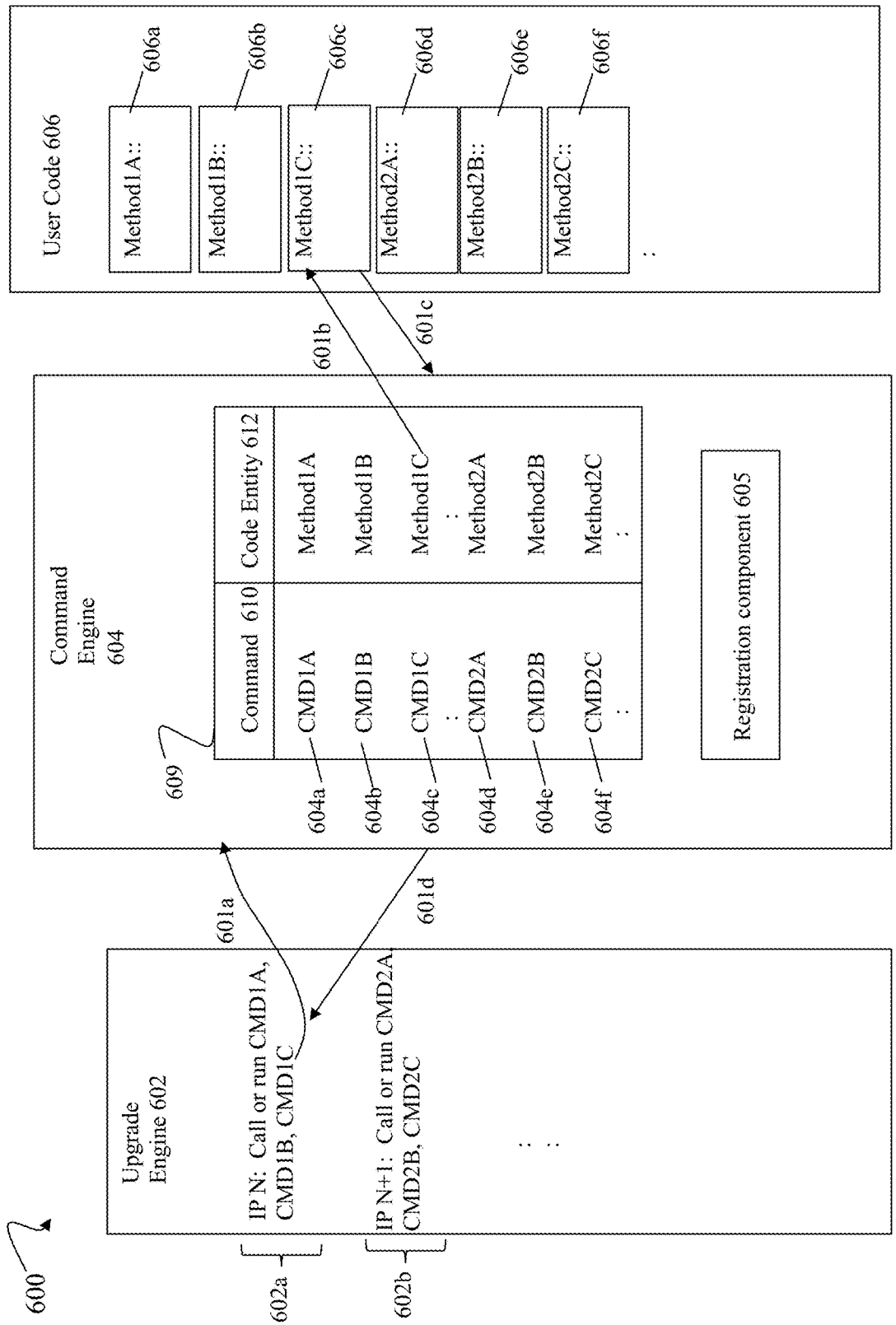

Referring to FIG. 7, shown is an example 600 illustrating components that can be used in at least one embodiment in accordance with the techniques of the present disclosure.

The example 600 includes the upgrade engine 602, the command engine 604, and the user code 606. The upgrade engine 602 and the command engine 604 can be included in the upgrade infrastructure code. The user code 606 can denote additional code that is provided, by a user, such as a developer of a feature, facility or service being upgraded using the upgrade infrastructure code.

In at least one embodiment, the upgrade engine 602 can include a state machine that implements the upgrade workflow processing and associated integration points. In at least one embodiment, the upgrade states of the state machine can include states corresponding to the processing and integration points as described in connection with FIG. 3.

To further illustrate, reference is made to FIG. 7 where the upgrade engine 602 includes integration point (IP) N 602a and IP N+1 602b, where N can generally denote an integer corresponding to a defined IP, and wherein N+1 can generally denote the next consecutive defined IP in the sequence of IPs of the upgrade workflow processing. For example, IP N and IP N+1 can denote, respectively, IP6 and IP7.

The element 602a identifies the list of commands associated with IP N, whereby such commands of 602a can be invoked, called executed or run at runtime by the upgrade engine 602. The element 602a indicates that the list of commands associated with IP N includes CMD1A, CMD1B, and CMD1C. The element 602b identifies the list of commands associated with IP N+1, whereby such commands of 602b can be invoked, called executed or run at runtime by the upgrade engine. The element 602b indicates that the list of commands associated with IP N+1 includes CMD2A, CMD2B, and CMD2C.

The command engine 604 can generally denote the command infrastructure of the upgrade infrastructure. The command engine 604 can include code that facilitates the runtime linkage and transfer of control between the upgrade infrastructure code and user code 606 when executing commands at each integration point of the upgrade infrastructure. In at least one embodiment, the command engine 604 can include a registration component 604 where the upgrade engine 602 registers and associates each command with its corresponding method, routine or other code entity of the user code 606, where, in response to the upgrade engine 606 executing the command, the command engine 604 can perform processing to transfer runtime control to the corresponding method, routine or other code entity of the user code 606. Additionally, once the invoked method, routine or other code entity associated with the executed command has completed, the command engine 604 can facilitate returning control back to the upgrade engine 602 along with any information returned by the invoked method, routine or other code entity. Such information returned by the invoked method, routine or other code entity can include, for example, a return status regarding the state of upgrade work or processing performed by the invoked method, routine or other code entity. The return status can indicate, for example, whether upgrade work performed by the invoked method, routine or other code entity had a good, normal healthy result or status, an error or failure status, a warning status, and possibly other defined allowable resulting states supported in an embodiment.

In at least one embodiment, the registration component 605 can generate the table 609 of registrations, where each registration can identify a command and an associated code entity to be invoked at runtime. In at least one embodiment consistent with other discussion herein, the upgrade engine 602 can perform processing at runtime for each of the commands associated with an integration point, where the command can, for example, be included in content as described in connection with FIG. 6. For each command and associated code entity or command handler, the upgrade engine 602 can communicate with the registration component 605 to add a registration for the command and associated code entity or command handler to the table 609. In the example of FIG. 7, the table 609 includes an entry or line for each registered pair of a command (column 610) and its associated code entity or command handler (column 612). For example, the entry 604a can denote the registration for the command CMD1A of the IPN 602a where the registration include CMD1A in column 610 and its associated code entity or command handler, Method1A, in the column 612. The entry 604b can denote the registration for the command CMD1B of the IPN 602a where the registration include CMD1B in column 610 and its associated code entity or command handler, Method1B, in the column 612. The entry 604c can denote the registration for the command CMD1C of the IPN 602a where the registration include CMD1C in column 610 and its associated code entity or command handler, Method1C, in the column 612. The entry 604d can denote the registration for the command CMD2A of the IP N+1 602b where the registration include CMD2A in column 610 and its associated code entity or command handler, Method2A, in the column 612. The entry 604e can denote the registration for the command CMD2B of the IP N+1 602b where the registration include CMD2B in column 610 and its associated code entity or command handler, Method2B, in the column 612. The entry 604f can denote the registration for the command CMD2C of the IP N+1 602b where the registration include CMD2C in column 610 and its associated code entity or command handler, Method2C, in the column 612.

In the example 600, the user code 606 can include code of the methods 606a-f, respectively, for the code entities or command handlers identified by the registration entries 604a-f.

To further illustrate runtime processing of command execution in at least one embodiment, the upgrade engine 602 can perform upgrade workflow processing and reach IP N. Upon reaching IP N in the upgrade workflow, the upgrade engine 602 can obtain the list of commands 602a, and then execute each of the commands of 602a. Executing each of the commands of 602a can include calling the command engine 604 and identifying the particular command being executed. The command engine 604 can then use the information in the table 609 to determine the particular code entity or command handler associated with, or mapped to, the command being executed. The command engine 604 can then invoke, or more generally, facilitate the transfer of control to, the particular code entity or command handler associated with, or mapped to, the command being executed. To further illustrate, assume that the upgrade engine 602 is at IP N, has completed execution of the first 2 commands CMD1A and CMD1B, and now runs the third command CMD1C of 602a. The upgrade engine 602 can call 601a the command engine 604 to execute the first command CMD1C. In response, the command engine 604 can search the registration table 609 for an entry corresponding to the command CMD1C. In this example, the command engine 604 can locate the entry 604c denoting the association or mapping of the command CMD1C to the code entity or command handler Method 1C. In this case, the command engine 604 can then invoke or transfer runtime control (601b) to the Method 1C 606c of the user code 606. Once the Method1C 606C completes, control can be returned (601c) to the command engine 604, and then further returned (601d) to the upgrade engine 602.

In at least one embodiment, an executed or invoked command handler, such as the Method 1C 606C, can return information to the upgrade engine 602. The returned information can include, for example, a return status indicating the results of upgrade work or the particular upgrade task performed by the Method 1C 606C. The upgrade engine 602 can then perform appropriate subsequent processing based on the return status from the Method 1C 606c. For example in at least one embodiment, if the return status is good or normal, the upgrade engine 602 can proceed with executing the next command, if any, in the command list 602a for the IP N. Once the upgrade engine 602 completes processing all the commands of a command list associated with a current IP, the upgrade engine 602 can proceed to subsequent upgrade workflow processing such as, for example, described in connection with FIG. 3. The subsequent processing can include, for example, performing additional upgrade work by the upgrade engine 602, executing commands of a next command list of a subsequent IP, such as IP N+1 603b, and the like.

If the return status indicates failure or an error and rollback for the current IPN is allowed, the upgrade engine 602 can proceed with rollback processing. The rollback processing for the IP N can include, for example, rolling back any upgrade tasks or work performed at the IP N prior to invoking the failed Method 1C. In at least one embodiment, it can be assumed that the failed Method 1C can locally perform any needed rollback work to undo any upgrade work Method 1C performed prior to failure (e.g., to thereby restore the system to a state as it was prior to invoking Method 1C). However in such an embodiment, additional rollback processing callbacks can be invoked to perform rollback processing on behalf of other commands of IPN that are executed prior to the failing command CMD1C. In the example 600, the commands CMD1A and CMD1B of 602a for IPN have completed execution prior to the CMD1C. Consistent with the discussion above and with the information in the table 609 of FIG. 7, executing CMD1A and CMD1B resulted in, respectively, invoking the methods 606a and 606b to perform associated upgrade tasks. In this case, the rollback processing performed responsive to the failure returned by the method Method1C for executing the command CMD1C can include rolling back upgrade work or tasks performed by the methods 606a-b for the commands CMD1A and CMD1B of 602a.

In at least one embodiment, rollback commands can be defined for rollback processing associated with the commands CMD1A and CMD1B. The rollback commands can be defined and used in a manner similar to that as described in connection with the upgrade task or work commands of FIG. 6. For example with reference back to FIG. 6, a rollback processing command list including 5 rollback commands can be specified for the 5 upgrade task or work commands. Each rollback processing command can have a specified naming convention and format such as, for example, "XXXRollback" where "XXX" denotes the matching command name portion of the upgrade command of FIG. 6 and where "Rollback" denotes a rollback processing command. For example, assume rollback processing is allowed in connection with IP6, the rollback processing commands can include "UpgradeVolumesToV2ClusterRollback", where "XXX" is "UpgradeVolumesToV2Cluster". Also in a similar manner, the user code can define classes corresponding to the rollback processing commands that are instantiated at runtime by the upgrade infrastructure code. The user code can also include corresponding methods or command handlers invoked at runtime when executing associated rollback processing commands. The associations between the rollback processing commands and corresponding command handlers can be registered with the registration component 605 and have corresponding entries in the table 609 as described above in connection with the upgrade tasks commands.

If the return status indicates failure or an error and rollback for the current IPN is not allowed, the upgrade engine 602 can proceed with recovery processing. In some embodiments both rollback processing and recovery processing can be performed in response to a failure by a command such as CMD1C of IP N. The recovery processing for the IP N can include, for example, performing any desirable recovery processing in connection with any upgrade tasks or work performed at the IP N prior to invoking the failed Method 1C. The recovery processing can include, for example, attempting to place the system and its components in a more stable state to facilitate successfully subsequently restarting the upgrade with the IPN. In at least one embodiment, the restart can include re-executing each of the commands of the failed IPN. In at least one embodiment, it can be assumed that the failed Method 1C can locally perform any needed recovery work for the Method 1C. However in such an embodiment, additional recovery processing callbacks can be invoked to perform any desired recovery processing on behalf of other commands of IPN that are executed prior to the failing command CMD1C. In the example 600, the commands CMD1A and CMD1B of 602a for IPN have completed execution prior to the CMD1C. Consistent with the discussion above and with the information in the table 609 of FIG. 7, executing CMD1A and CMD1B resulted in, respectively, invoking the methods 606a and 606b to perform associated upgrade tasks. In this case, the recovery processing performed responsive to the failure returned by the method Method1C for executing the command CMD1C can include recovery processing for the methods 606a-b for the commands CMD1A and CMD1B of 602a.

In at least one embodiment, recovery commands can be defined to perform recovery processing associated with the commands CMD1A and CMD1B. The recovery commands can be defined and used in a manner similar to that as described in connection with the upgrade task or work commands of FIG. 6. For example with reference back to FIG. 6, a recovery processing command list including 5 rollback commands can be specified for the 5 upgrade task or work commands. Each recovery processing command can have a specified naming convention and format such as, for example, "XXXRecovery" where "XXX" denotes the matching command name portion of the recovery command of FIG. 6 and where "Recovery" denotes a recovery processing command. For example, assume recovery processing is allowed in connection with IP6, the recovery processing commands can include "UpgradeVolumesToV2ClusterRecovery", where "XXX" is "UpgradeVolumesToV2Cluster". Also in a similar manner, the user code can define classes corresponding to the recovery processing commands that are instantiated at runtime by the upgrade infrastructure code. The user code can also include corresponding methods or command handlers invoked at runtime when executing associated recovery processing commands. The associations between the recovery processing commands and corresponding command handlers can be registered with the registration component 605 and have corresponding entries in the table 609 as described above in connection with the upgrade tasks commands.

With reference back to FIG. 3, the integration points 2A and 2B can collectively be considered as a single integration point 2 in at least one embodiment. In such an embodiment, the integration point 2B can be the rollback processing performed, as may be needed, to undo or rollback the upgrade task work or upgrade processing performed in connection with the integration point 2A. The rollback processing for integration pint 2B can be performed, for example, responsive to an upgrade failure occurring in connection with executing the commands of integration point 2A, and/or responsive to other upgrade work performed by the upgrade infrastructure on the primary appliance A1 335 during the rollback window 322a.

Figure 8:
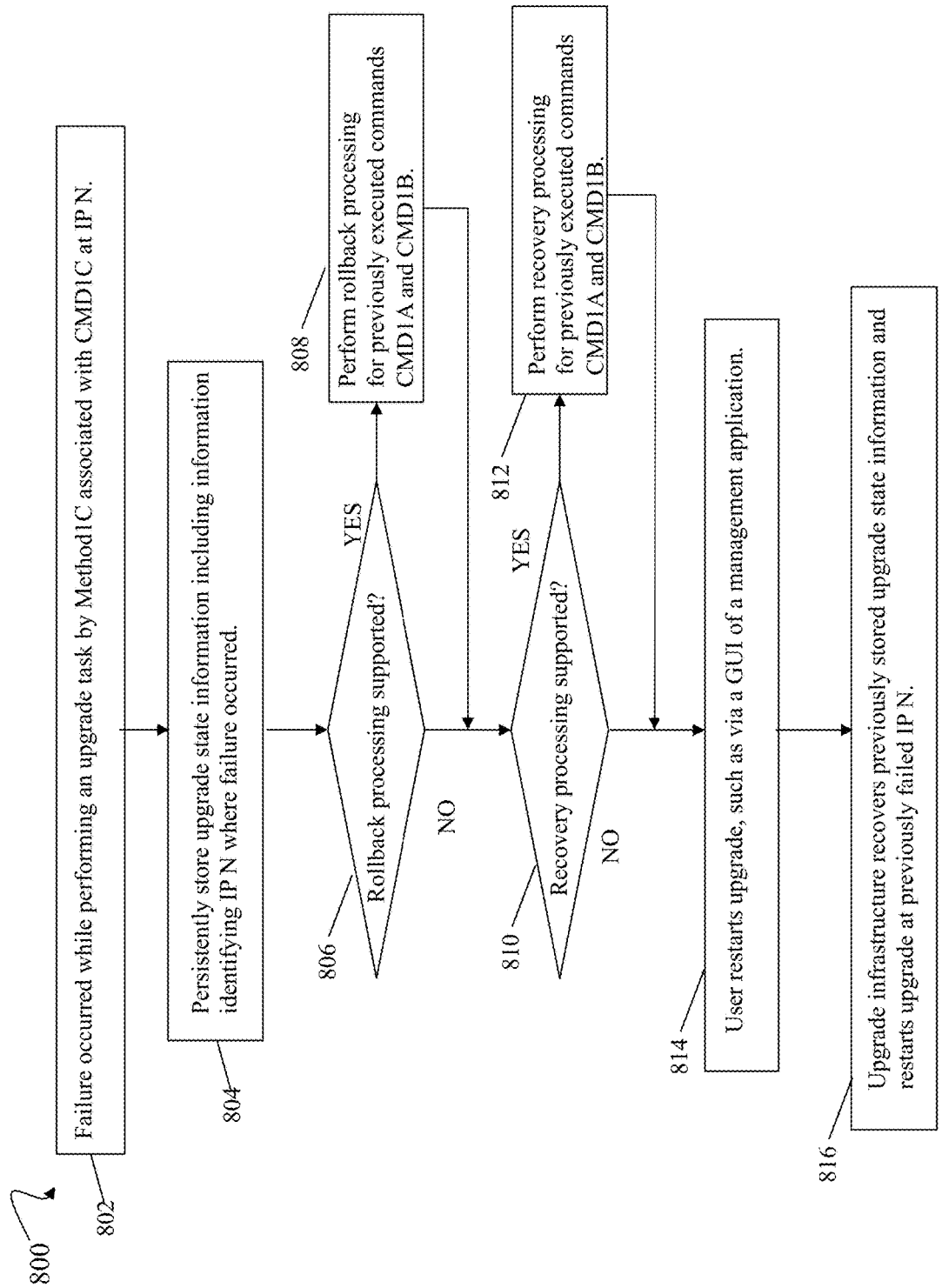

Referring to FIG. 8, shown is a flowchart 800 of processing steps that can be performed in at least one embodiment in accordance with the techniques of the present disclosure. The flowchart 800 generally summarizes processing described above in connection with the example 600 of FIG. 7.

At a step a step 802, a failure occurs while performing an upgrade task, such as by the method Method1C 606c when executing the command CMD1C at IP N. The step 802 can also include notifying a user of the system, such as a data storage administrator or manager. From the step 802 in response to the upgrade failure at the step 802, control proceeds to the step 804.

At the step 804, the upgrade engine 602 can persistently store information describing the current upgrade state. For example, the persistently stored information can indicate that a failure occurred during upgrade processing performed by the Method 1C 606 for the command CMD1C at IP N. From the step 804, control proceeds to a step 806.

At the step 806, a determination can be made as to whether rollback processing is supported at the failed IP N, whereby corresponding rollback commands can be defined for commands of the IP N. If the step 806 evaluates to yes, control proceeds to the step 808. At the step 808, rollback processing can be performed for the previously executed commands, such as the commands CMD1A and CMD1B in connection with this example. From the step 808, control proceeds to the step 810. If the step 806 evaluates to no, control proceeds directly to the step 810.

At the step 810, a determination can be made as to whether recovery processing is supported at the failed IPN, whereby corresponding recovery commands can be defined for commands of the IP N. If the step 810 evaluates to yes, control proceeds to the step 812. At the step 812, recovery processing can be performed for the previously executed commands, such as the commands CMD1A and CMD1B in connection with this example. From the step 812, control proceeds to the step 814. If the step 810 evaluates to no, control proceeds directly to the step 814.

At the step 814, the upgrade can be restarted, for example, by a user using a GUI of the management application. In some embodiments, restarting the upgrade can be performed automatically in response to having completed automated recovery processing performed at the step 812. From the step 814, control proceeds to the step 816.

At the step 816, the upgrade infrastructure executes and can recover the persistently stored upgrade state information (e.g., previously stored in the step 804). The upgrade infrastructure can restart upgrade processing at the previously failed IP, such as IP N. In at least one embodiment, the upgrade processing can restart and include executing each command of the failed IP, such as IP N.

It should be noted that the processing of FIG. 8 includes steps 806 and 810 where rollback processing and recovery processing can be optional. In at least one embodiment, the steps 806 and 810 can perform determinations, respectively, for rollback processing and recovery processing with respect to whether such processing is automated as described herein, for example, using commands or another automated technique that can be performed by the upgrade infrastructure. In some embodiments, completely automated rollback and/or recovery processing as performed by the upgrade infrastructure may not be supported. In some embodiments, at least some of the rollback and/or recovery processing can be performed using other mechanisms. For example, in at least one embodiment, fully automated recovery processing may not be supported. However, a user such as a data storage administrator or manager can manually perform recovery processing or take appropriate corrective action(s) such as, for example, initiating execution of a recovery script, making suitable modifications or corrections (e.g., such as to ensure a failed component such as an appliance, or a database is now available and online prior to restarting the upgrade). In any case, at least one embodiment can require that some form of recovery processing be performed prior to restarting the upgrade at the step 814. Otherwise, if no recovery processing has been performed, or more generally no corrective action has been taken to remove or alleviate the condition(s) causing the upgrade failure, it can be expected that the upgrade can fail again such as at the same prior point of failure in the step 802.

The upgrade workflow such as described herein (e.g., FIG. 3) can be driven and controlled by code of the upgrade infrastructure. Upgrade processing performed can include a collection of custom upgrade tasks, such as those performed at the different defined integration points, that work together to upgrade the system. With each release or upgrade, new features, facilities and services can be added to the upgrade and existing features, facilities and services can be upgraded. With each such new release or upgrade, existing upgrade tasks can be modified and some upgrade tasks such as associated with particular commands can be removed or retired. Additionally in at least one embodiment, some upgrade tasks can require complex orchestration to manage many steps or dependencies on other upgrade work including performing work on every appliance in the cluster.

The upgrade work for a particular feature for a particular release can be characterized in one aspect as temporary and can be applicable in some embodiments only for use with the particular feature and only when upgrading to the particular release. For example, consider upgrading a feature F1 from V1 to V2 where the upgrade includes adding a new table to the management database at integration point 3B and then populating the new table at integration point 6 using the new management database schema table However, when upgrading F1 from V2 to V3, processing for the foregoing is not needed and the particular upgrade task or work performed for upgrading F1 from V2 to V3 can be completely different. In this manner in at least one embodiment, the techniques of the present disclosure provide a pluggable architecture to which user code performing the upgrade tasks or work can be easily integrated with the upgrade infrastructure or framework. Subsequently, the user code performing the upgrade tasks or work can be easily removed or decoupled as needed from the upgrade infrastructure or framework after a particular upgrade of a particular feature is performed.

In at least one embodiment, to manage the large number of custom upgrade tasks, each custom upgrade task can be encapsulated in a single command as described above that is plugged into the upgrade workflow. In at least one embodiment, the user provided code entity associated with, and invoked in response to execution of, the command can locally within the user code entity handle processing for different possible runtime behaviors encountered such as, for example, normal non-error processing when performing upgrade work, failure when performing upgrade work, and rollback and recovery processing for the upgrade work performed in connection with the command. If an upgrade task is complex and involves multiple operations or performs work on every appliance in the cluster, in at least one embodiment an orchestration or wrapper command can encapsulate the upgrade task where the wrapper command can then run, invoke or perform multiple subcommands. In such an embodiment, there can be multiple levels of commands. To further illustrate, a command, EnableFeatureA, can be executed by the upgrade infrastructure code at an integration point. When that command is received and processed by a user provided code entity (e.g., the user provided code entity method, routine, or module, command handler) associated with the command, the code entity can perform upgrade work locally on a first appliance, such as the primary appliance, which can then send other commands (e.g., subcommands) to other appliances to perform upgrade work on the other appliances. In this case, the command EnableFeatureA can be viewed as the orchestrator or wrapper command that further coordinates additional upgrade work performed in connection with the subcommands issued to the other appliances. Generally, the orchestrator or wrapper command can orchestrate a complex workflow composed of subcommands for an upgrade task. As another example, consider an upgrade task performed in connection with adding support for NVMe at integration point 6 as discussed elsewhere herein. The management database schema can be modified at integration point 5B to add NVMe support such as add one or more new LUN attributes used with NVMe, and existing content of the management database can be migrated or transformed at integration point 6 to adapt to the existing data of the management database to the updated management database schema. A wrapper command can be invoked by the upgrade infrastructure code at integration point 6, where the wrapper command can orchestrate the steps (e.g., subcommands) to perform upgrade processing including: generating the GUIDs, updating the content of the primary copy (331) of the management database on the primary appliance 335 to include the generated GUIDs for existing LUNs, and then send a subcommand to each remaining secondary appliance 336-338 in the cluster to accordingly update the appliance local copies of the management database used locally by the appliances 336-338 (e.g., synchronize the appliance local copies of the management database with the primary copy). As may be needed, each of the subcommands at a first level can also execute or issue one or more additional subcommands at a second level for upgrade work performed on each appliance locally or elsewhere. Generally in at least one embodiment, the wrapper command can be considered the root or initial command of a hierarchy of multiple levels of subcommands. The maximum number of allowable levels in the command hierarchy can vary with embodiment.

Embodiments in accordance with the techniques of the present disclosure, such as those, described herein, can provide advantages. Consistent with other discussion herein, upgrade tasks or work can be easily integrated into the upgrade workflow at appropriate integration points depending on the particular type of upgrade work performed. When a change is made to the user code that performed upgrade tasks for a particular feature, service or facility, code of the upgrade infrastructure does not have to be modified. In at least one embodiment, the upgrade task or work can be encapsulated in one or more commands and associated user provided code invoked in response to running the one or more commands. In at least one embodiment, the upgrade infrastructure can perform processing to automatically orchestrate additional processing performed when an upgrade failure occurs when executing a command and its associated upgrade task. In at least one embodiment, the upgrade infrastructure can perform processing to automatically orchestrate additional processing performed to enable subsequently restarting the upgrade workflow process. Having a clear line of separation between the upgrade infrastructure code and other user code that performs the upgrade tasks can facilitate testing in that if only the user code is modified, retesting all the upgrade infrastructure code may not be required. Additionally, as noted above, removal of user code between releases or upgrades can be facilitated.

In at least one embodiment as discussed above, such as in connection with FIGS. 7 and 8, commands associated with an integration point can be called more than once during the upgrade. For example, as discussed above in connection with FIGS. 7 and 8, a command can be re-executed after an upgrade failure. In such an embodiment, the upgrade task or work embodied in a user code entity invoked in response to the command can be idempotent, where the command can be implemented such that calling the command more than once with the same input parameters does not result in different behavior than when the command is called only once.

In at least one embodiment, information returned by a code entity associated with a command (e.g., where the code entity is invoked in response to executing the associated command) can return information including a message regarding the processing results of the upgrade task performed. In the event the upgrade task or work results in an error or failure, the returned message can be an error message provided to a customer performing the upgrade. In at least one embodiment where the customer can take steps in connection with recovery processing, the error message can be localized and have sufficient context and advice to direct the customer regarding potential corrective recovery actions to be taken. The message can, for example, indicate that the upgrade for a particular feature or container is not complete and can also identify what needs to be done to complete the upgrade for the particular feature. In at least one embodiment, the code entity invoked to perform the upgrade task in response to executing a particular command can also record status or result information in a log, such as a system log.

For example, assume that an upgrade tasks experiences an error or fails when upgrading the schema of the management database. In this case in at least one embodiment where a user can perform recovery processing, the following error message and information can be returned to the customer performing the upgrade:

'Management Database Upgrade initiated on cluster commit failed with internal error. Contact your service provider.'
Database Upgrade
0xE04060010001=Management Database Upgrade initiated on cluster commit failed with internal error. Contact your service provider.

In at least one embodiment, failures, errors and other entries recorded in a system log can be in accordance with the a defined standard. For example, information recorded in the system log by a code entity invoked to perform the upgrade task in response to executing a particular command can include a predefined string or marker, such as "NDU" denoting that the logged entry is associated with upgrade processing.

In at least one embodiment, the order in which a command occurs in a command list of an associated integration point can by default determine the order in which the command is called relative to other commands at the same integration point. For example with reference to FIG. 6, the order in which commands are added to the list as they appear in sequential lines scrolling down the FIG. 6 from 704*b* through 704*f* can be sequential order in which the commands of IP 6 are executed. In such an embodiment by default, the sequential order in which the commands appear in the command list can be executed sequentially so that a next sequentially specified command, CMDn+1, does not commence until the prior command of the sequence, CMDn, completes without failure. At least one embodiment can include support which allows a user to specify a required sequential order in which the commands of a particular integration point are to be executed denoting an order execution dependency.

In at least one embodiment, additional syntax can be specified when adding commands to a list for an integration point, or more generally associating commands with an integration point, to denote different supported command execution options. For example, in at least one embodiment, additional syntax can be added to specify which commands can execute concurrently, at the same time, or asynchronously. For example, an embodiment can commence execution of multiple commands at the same time, or overlap execution of the multiple commands which can execute asynchronously at the same time (e.g., where any one of the multiple commands executing asynchronously at the same time can complete before any other ones of the commands). An embodiment can also include additional syntax allowing a user to specify explicit execution order dependencies between commands rather than just rely on a default execution order indicated by the sequential order in which the commands are added or placed in the command list of an integration point. In at least one embodiment where multiple commands can be in flight or executing at the same time, additional upgrade state information can be persistently stored regarding the state of an upgrade. For example, assume that the upgrade infrastructure commences execution of the following 3 commands—CMD1, CMD2 and CMD3—at the same time so that all 3 commands are executing and not yet complete at the same time. Persistently stored upgrade state information can indicate, for example, which commands are in-flight where execution has commenced but not yet completed; which commands have completed without failure or with a particular status; which commands of a particular integration point have not yet been executed or not yet commence execution; and the like.

Consistent with discussion above in at least one embodiment, each integration point can also be an upgrade workflow restart point. A restart point can denote the workflow processing point where the upgrade continues when it is restarted after a failure occurs during the upgrade. When upgrade processing fails at an integration point, the recovery process can include recovering from the cause of the failure and then re-trying upgrade processing to complete the upgrade. In at least one embodiment, upgrade processing can restart and resume from the last point of failure in the workflow, such as the last integration point where the upgrade failure occurs. When restarting from the last integration point that failed, restarting can include replaying the entire list of integration point commands for the last integration point even if some of the commands of the last integration point previously completed successfully before the subsequent failure when executing another command of the last integration point. As a result in such an embodiment, upgrade commands and associated invoked code entities can support restart after failure and can be idempotent.

In at least one embodiment, upgrade commands operating in integration points that are executed during the cluster rollback window can be required to support rollback processing. In such an embodiment with reference to FIG. 3, commands executing during the cluster rollback window 350 can be required to provide a rollback command placed into the appropriate rollback integration point in the upgrade infrastructure. For example, as discussed above in such an embodiment, a rollback command can be specified for a corresponding upgrade command at integration point 2 (e.g., where the rollback command can correspond to a command of integration point 2B and where its corresponding upgrade command can correspond to a command at integration point 2A). In at least one embodiment, rollback processing performed by an integration point within the cluster rollback window 350 can perform processing to rollback or undo upgrade work performed in connection with the integration point. Additionally when rollback processing is performed for an integration point within the window 350, addition rollback processing can be performed to rollback the upgrade at the cluster or system level. For example with reference to integration points 2A and 2B viewed as a single integration point 2 discussed above, consider a case where an upgrade failure occurs during the appliance A1 335 rollback window 322*a* (e.g., such as when upgrading the software of the appliance 335 from V1 to V2). In response to the upgrade failure, rollback processing associated with integration point 2 (e.g., integration point 2B) can be performed. Additionally, other rollback processing can be performed to rollback the cluster upgrade, where such other rollback processing can include restoring node A of the primary appliance 335 to run the V1 code rather than the upgrade V2 code.

In at least one embodiment, rollback processing for upgrade commands executed outside the cluster rollback window 350 (e.g., where the upgrade command is associated with an integration point that is not within the window 350) can result in rolling back upgrade work performed for the associated integration point but without performing additional rollback processing at the cluster or system level. In such an embodiment, if the invoked code entity performing the upgrade task for the upgrade command detects a failure, the invoked code entity can perform its own local processing to perform any necessary rollback, recovery, and the like, before returning a status of failure to the upgrade infrastructure. In this manner, the invoked code entity can locally perform any desired processing upon the occurrence of an upgrade processing failure in order to leave the system, and the particular feature being upgraded, in as good a state as possible given the failure in order to facilitate replaying or re-executing the upgrade command when the upgrade is subsequently restarted. Consistent with other discussion herein (e.g., FIG. 8), the invoked code entity that detected a failure in connection with its upgrade work performed can return a failure status to the upgrade infrastructure code which, in turn, can invoke any other necessary rollback commands for the integration point, and then stop the upgrade workflow processing after completing rollback processing for the integration point experiencing the upgrade failure.

In at least one embodiment, rollback commands associated with integration points can be executed in connection with any upgrade failure independent of whether the upgrade failure occurs within cluster rollback window 350 or the cluster rollforward window 352. The difference in rollback processing performed within the window 350 versus the window 352 is that the upgrade failure and rollback processing for an integration point occurring within the window 350 can also trigger additional cluster rollback processing. Rollback processing for command(s) executed inside the cluster rollback window 350 can roll back the command(s) and rollback the cluster upgrade. Rollback processing for command(s) executed outside the cluster rollback window 350 can roll back the command(s) but do not perform additional rollback processing such as, for example, to rollback the V2 software upgrade that may have completed on one or more appliances. In this latter case where the failure and thus rollback processing occurs outside the window 350, the upgrade can fail and thus stop after completing rolling back processing for the one or more commands of the integration point associated with the failure.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
defining a plurality of integration points, wherein each of the plurality of integration points is associated with one of a plurality of workflow processing points included in an upgrade workflow;
receiving a plurality of command lists, wherein each of the plurality of command lists includes one or more commands and is associated with one of the plurality of integration points;
associating each command included in one of the plurality of command lists with one of a plurality of code entities; and
performing a first processing that performs the upgrade workflow to upgrade a system, wherein the first processing further includes:
executing a first executable code corresponding to the plurality of workflow processing points, wherein a first workflow processing point of the plurality of workflow processing points is associated with a first integration point of the plurality of integration points; and
in response to said executing reaching the first workflow processing point corresponding to the first integration point, performing a second processing including:
executing one or more commands of a first command list of the plurality of command lists, wherein the first command list is associated with the first integration point; and
for each of the one or more commands of the first command list that is executed, invoking a corresponding one of the plurality of code entities associated with said each command of the first command list, wherein said corresponding one code entity performs first customized processing in connection with upgrading a first feature, facility or service in the system.

2. The computer-implemented method of claim 1, wherein each command included in one of the plurality of command lists is associated with a corresponding one of the plurality of code entities that performs customized processing in connection with upgrading a feature, facility or service in the system.

3. The computer-implemented method of claim 2, wherein each command included in one of the plurality of command lists denotes a single upgrade task in connection with upgrading one feature, facility or service in the system.

4. The computer-implemented method of claim 3, wherein upgrading the first feature, facility or service includes performing a first plurality of upgrade tasks associated with the first integration point, and wherein the first command list includes commands denoting the first plurality of upgrade tasks.

5. The computer-implemented method of claim 4, wherein upgrading the first feature, facility or service includes performing a second plurality of upgrade tasks associated with a second integration point of the plurality of integration points, wherein the second integration point is different than the first integration point, and wherein a second command list of the plurality of command lists includes commands denoting the second plurality of upgrade tasks.

6. The computer-implemented method of claim 5, wherein the plurality of workflow processing points includes a second workflow processing point, and wherein the method further comprising:
   in response to said executing reaching a second workflow processing point corresponding to the second integration point, performing third processing including:
      executing one or more commands of the second command list, wherein the second command list is associated with the second integration point; and
      for each of the one or more commands of the second command list that is executed, invoking one of the plurality of code entities that is associated with the said each command of the second command list, wherein said one code entity performs second customized processing in connection with upgrading the first feature, facility or service in the system.

7. The computer-implemented method of claim 4, further comprising:
   in response to determining that an upgrade failure occurs during a rollback window, performing first rollback processing that rolls back upgrade processing performed for a plurality of features, facilities or services including the first feature, facility or service.

8. The computer-implemented method of claim 7, wherein the upgrade failure occurs at the first integration point when executing a first command of the first command list, wherein the upgrade failure occurs at the first integration point after executing a second command of the first command list, and wherein first rollback processing includes invoking one of a plurality of rollback code entities corresponding to the second command.

9. The computer-implemented method of claim 7, wherein the rollback window is included in a cluster rollback window.

10. The computer-implemented method of claim 8, further comprising:
    persistently storing upgrade state information indicating that the upgrade failure occurred at the first integration point; and
    responsive to the upgrade failure occurring at the first integration point, restarting the upgrade workflow at the first integration point and executing each command of the first command list.

11. The computer-implemented method of claim 4, further comprising:
    in response to determining an upgrade failure, performing processing including first recovery processing for a plurality of features, facilities or services including the first feature, facility or service.

12. The computer-implemented method of claim 11, wherein the upgrade failure occurs at the first integration point when executing a first command of the first command list, wherein the upgrade failure occurs at the first integration point after executing a second command of the first command list, and wherein the first recovery processing includes invoking one of a plurality of recovery code entities corresponding to the second command, wherein said one recovery code entity performs recovery processing for the second command failing at the first integration point.

13. The computer-implemented method of claim 12, further comprising:
    persistently storing upgrade state information indicating that the upgrade failure occurred at the first integration point; and
    responsive to the upgrade failure occurring at the first integration point, restarting the upgrade workflow at the first integration point.

14. The computer-implemented method of claim 13, wherein said restarting includes executing each command of each of the plurality of command lists, including the first command list, associated with the first integration point.

15. The computer-implemented method of claim 1, further comprising:
    registering each command, that is included in one of the plurality of command lists, with a command engine, wherein said registering includes identifying an associated one of a plurality of code entities to be invoked responsive to executing said each command.

16. The computer-implemented method of claim 15, wherein the first processing is performed by an upgrade engine, wherein the command engine and the upgrade engine are included in an upgrade infrastructure, wherein the upgrade engine includes the first executable code that implements a state machine controlling the upgrade workflow to upgrade the system.

17. The computer-implemented method of claim 16, wherein the system is a data storage system.

18. A system comprising:
    one or more processors; and
    a memory comprising code stored thereon that, when executed by at least a first of the one or more processors, performs a method comprising:
       defining a plurality of integration points, wherein each of the plurality of integration points is associated with one of a plurality of workflow processing points included in an upgrade workflow;
       receiving a plurality of command lists, wherein each of the plurality of command lists includes one or more commands and is associated with one of the plurality of integration points;
       associating each command included in one of the plurality of command lists with one of a plurality of code entities; and
       performing a first processing that performs the upgrade workflow to upgrade a system, wherein the first processing further includes:
          executing a first executable code corresponding to the plurality of workflow processing points, wherein a first workflow processing point of the plurality of workflow processing points is associated with a first integration point of the plurality of integration points; and
          in response to said executing reaching the first workflow processing point corresponding to the first integration point, performing a second processing including:
             executing one or more commands of a first command list of the plurality of command lists, wherein the first command list is associated with the first integration point; and
             for each of the one or more commands of the first command list that is executed, invoking a corresponding one of the plurality of code entities associated with said each command of the first command list, wherein said corresponding one code entity performs first customized processing in connection with upgrading a first feature, facility or service in the system.

19. A non-transitory computer readable medium comprising code stored thereon that, when executed by a processor, performs a method comprising:
- defining a plurality of integration points, wherein each of the plurality of integration points is associated with one of a plurality of workflow processing points included in an upgrade workflow;
- receiving a plurality of command lists, wherein each of the plurality of command lists includes one or more commands and is associated with one of the plurality of integration points;
- associating each command included in one of the plurality of command lists with one of a plurality of code entities; and
- performing a first processing that performs the upgrade workflow to upgrade a system, wherein the first processing further includes:
  - executing a first executable code corresponding to the plurality of workflow processing points, wherein a first workflow processing point of the plurality of workflow processing points is associated with a first integration point of the plurality of integration points; and
  - in response to said executing reaching the first workflow processing point corresponding to the first integration point, performing a second processing including:
    - executing one or more commands of a first command list of the plurality of command lists, wherein the first command list is associated with the first integration point; and
    - for each of the one or more commands of the first command list that is executed, invoking a corresponding one of the plurality of code entities associated with said each command of the first command list, wherein said corresponding one code entity performs first customized processing in connection with upgrading a first feature, facility or service in the system.

* * * * *